United States Patent
Stipech et al.

(10) Patent No.: US 11,756,020 B1
(45) Date of Patent: Sep. 12, 2023

(54) GESTURE AND CONTEXT INTERPRETATION FOR SECURE INTERACTIONS

(71) Applicant: Block, Inc., San Francisco, CA (US)

(72) Inventors: Kristopher David Stipech, New York, NY (US); Robert Andersen, Brooklyn, NY (US); Eli Rousso, New York, NY (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/528,558

(22) Filed: Jul. 31, 2019

(51) Int. Cl.
*G06Q 20/32* (2012.01)
*G06Q 20/42* (2012.01)
*G06F 3/04847* (2022.01)
*G06F 3/04817* (2022.01)
*G06F 3/0486* (2013.01)
*G06N 20/00* (2019.01)

(52) U.S. Cl.
CPC ....... *G06Q 20/3223* (2013.01); *G06F 3/0486* (2013.01); *G06F 3/04817* (2013.01); *G06F 3/04847* (2013.01); *G06N 20/00* (2019.01); *G06Q 20/42* (2013.01)

(58) Field of Classification Search
CPC .... G06Q 20/3223; G06Q 20/42; G06N 20/00; G06F 3/04817; G06F 3/04847; G06F 3/0486
USPC .......................................................... 705/41
See application file for complete search history.

(56) References Cited

U.S. PATENT DOCUMENTS

| | | | |
|---|---|---|---|
| 4,873,631 A | 10/1989 | Nathan et al. |
| 5,221,838 A | 6/1993 | Gutman et al. |
| 5,768,521 A | 6/1998 | Dedrick |
| 5,884,288 A | 3/1999 | Chang et al. |
| 5,963,926 A | 10/1999 | Kumomura |
| 6,115,601 A | 9/2000 | Ferreira |
| 7,039,875 B2 | 5/2006 | Khalfay et al. |

(Continued)

FOREIGN PATENT DOCUMENTS

| | | |
|---|---|---|
| WO | 00/79452 A2 | 12/2000 |
| WO | 2007/008686 A2 | 1/2007 |

(Continued)

OTHER PUBLICATIONS

Final Office Action dated Jun. 1, 2020, for U.S. Appl. No. 15/199,596, of Grassadonia, B., et al., filed Jun. 30, 2016.

(Continued)

*Primary Examiner* — Jessica Lemieux
*Assistant Examiner* — Merritt J Hasbrouck
(74) *Attorney, Agent, or Firm* — Lee & Hayes, P.C.

(57) ABSTRACT

In one embodiment, a method includes storing, in a data store maintained by a payment service, transaction history information associated with two financial accounts of a user. Upon detecting an intent by the user to transfer funds between the first financial account and the second financial account via an application executing on a device of the user, a prediction of a suggested amount of funds for a user to transfer from the first financial account to the second financial account is generated. The payment service sends instructions to the user's mobile device to display the suggested amount of funds with a request to confirm the transfer. Upon receiving confirmation from the mobile device, the payment service initiates the transfer.

21 Claims, 12 Drawing Sheets

(56) References Cited

U.S. PATENT DOCUMENTS

| | | |
|---|---|---|
| 7,200,551 B1 | 4/2007 | Senez |
| 7,447,794 B1 | 11/2008 | Miller et al. |
| 7,693,268 B2 | 4/2010 | Rossi et al. |
| 7,865,548 B2 | 1/2011 | Chen et al. |
| 3,036,913 A1 | 10/2011 | Pinsonneault et al. |
| 8,082,196 B2 | 12/2011 | Mullan et al. |
| 8,249,965 B2 | 8/2012 | Tumminaro |
| 8,388,574 B2 | 3/2013 | Hirszowicz et al. |
| 8,494,957 B2 | 7/2013 | Singhal |
| 8,589,300 B2 | 11/2013 | Hammad et al. |
| 8,645,213 B2 | 2/2014 | Granbery et al. |
| 8,660,948 B2 | 2/2014 | Dessert et al. |
| 9,514,217 B2 | 12/2016 | Jagadish et al. |
| 9,596,237 B2 | 3/2017 | Law et al. |
| 9,836,739 B1 | 12/2017 | Borovsky et al. |
| 10,037,535 B2 | 7/2018 | Fordyce, III et al. |
| 10,102,515 B2 | 10/2018 | Vastenavondt et al. |
| 10,127,532 B1 | 11/2018 | Grassadonia |
| 10,453,049 B2 | 10/2019 | Grassadonia |
| 10,460,395 B2 | 10/2019 | Grassadonia |
| 2005/0102188 A1 | 5/2005 | Hutchison et al. |
| 2007/0118449 A1 | 5/2007 | De La Motte |
| 2009/0299883 A1 | 12/2009 | Baumgartner, IV et al. |
| 2010/0205652 A1 | 8/2010 | Bouchard et al. |
| 2011/0213710 A1 | 9/2011 | Newman et al. |
| 2011/0258079 A1 | 10/2011 | Ngan |
| 2011/0289006 A1 | 11/2011 | Hutchison et al. |
| 2013/0103580 A1 | 4/2013 | Ventura |
| 2014/0114857 A1 | 4/2014 | Griggs et al. |
| 2015/0348038 A1 | 12/2015 | Femrite et al. |
| 2016/0125371 A1 | 5/2016 | Grassadonia et al. |
| 2017/0200150 A1 | 7/2017 | Cohn et al. |
| 2017/0323345 A1* | 11/2017 | Flowers ............. G06Q 30/0269 |
| 2017/0357966 A1 | 12/2017 | Chandrasekhar et al. |
| 2018/0005203 A1 | 1/2018 | Grassadonia et al. |
| 2018/0114216 A1* | 4/2018 | Joseph ............. G06Q 20/40145 |
| 2019/0080303 A1* | 3/2019 | Nair ...................... G06F 1/1694 |
| 2019/0378112 A1 | 12/2019 | Grassadonia |
| 2022/0076230 A1 | 3/2022 | Grassadonia |

FOREIGN PATENT DOCUMENTS

| | | | | |
|---|---|---|---|---|
| WO | WO-2016068854 A1 * | 5/2016 | ........... | G06Q 20/027 |
| WO | 2018/005635 A2 | 1/2018 | | |

OTHER PUBLICATIONS

Cohen, E.E., "XBRL's Global Ledger Framework: Exploring the standardised missing link to ERP integration" International Journal of Disclosure and Governance, vol. 6, Issue 3, pp. 188-206 (Mar. 16, 2009).

Final Office Action dated Nov. 16, 2017, for U.S. Appl. No. 15/198,793, of Grassadonia, B., filed Aug. 17, 2017.

International Search Report and Written Opinion for International Patent Application No. PCT/US2017/039731, dated Feb. 6, 2018.

Isa, A.A., "The Treasury Single Account (TSA) as an Instrument of Financial Prudence and Management: Prospects and Problems" Research Journal of Finance and Accounting, vol. 7, Issue 4, pp. 66-71 (2016).

Non-Final Office Action dated Jun. 11, 2018, for U.S. Appl. No. 15/198,793, of Grassadonia, B., filed Jun. 30, 2016.

Non-Final Office Action dated Mar. 1, 2019, for U.S. Appl. No. 15/199,724, of Grassadonia, B., filed Jun. 30, 2016.

Non-Final Office Action dated May 1, 2017, for U.S. Appl. No. 15/198,793, of Grassadonia, B., filed Jun. 30, 2016.

Non-Final Rejection dated Nov. 14, 2018, for U.S. Appl. No. 15/199,596, of Grassadonia, B., filed Jun. 30, 2016.

Notice of Allowance dated Jan. 28, 2019, of U.S. Appl. No. 15/198,793, Grassadonia, B., filed Jun. 30, 2016.

Notice of Allowance dated Jun. 26, 2019, for U.S. Appl. No. 15/198,793, Grassadonia, B., filed Jun. 30, 2016.

Notice of Allowance dated Jun. 26, 2019, for U.S. Appl. No. 15/199,724, of Grassadonia, B., filed Jun. 30, 2016.

Final Office Action dated Jun. 28, 2019, for U.S. Appl. No. 15/199,596, of Grassadonia, B., filed Jun. 30, 2016.

Notice of Allowance dated Aug. 28, 2019, for U.S. Appl. No. 15/199,724, of Grassadonia, B., filed Jun. 30, 2016.

Non-Final Office Action dated Nov. 18, 2019, for U.S. Appl. No. 15/199,596, of Grassadonia, B., et al., filed Jun. 30, 2016.

Pena et al. "Financial Record-Keeping Software Review." Bulletin/ Texas Agricultural Extension Service; No. 5089, (Year:1994).

Amin, Y. et al., "GnuCash Help Manual", (2002), pp. 1-201.

Non-Final Office Action dated Sep. 27, 2021, U.S. Appl. No. 16/549,816, of Grassadonia, B., filed Jun. 30, 2016.

Non-Final Office Action dated Mar. 25, 2022, U.S. Appl. No. 17/527,023, of Grassadonia, B., filed Nov. 15, 2021.

Office Action for European Application No. 17742581.6, dated May 14, 2021.

Final Office Action dated Jun. 7, 2022, U.S. Appl. No. 17/527,023, of Grassadonia, B., filed Nov. 15, 2021.

Non-Final Office Action dated Oct. 3, 2022, U.S. Appl. No. 16/549,816, of Grassadonia, B., filed Aug. 23, 2019.

Notice of Allowance dated Nov. 10, 2022, U.S. Appl. No. 17/527,023, of Grassadonia, B., filed Nov. 15, 2021.

* cited by examiner

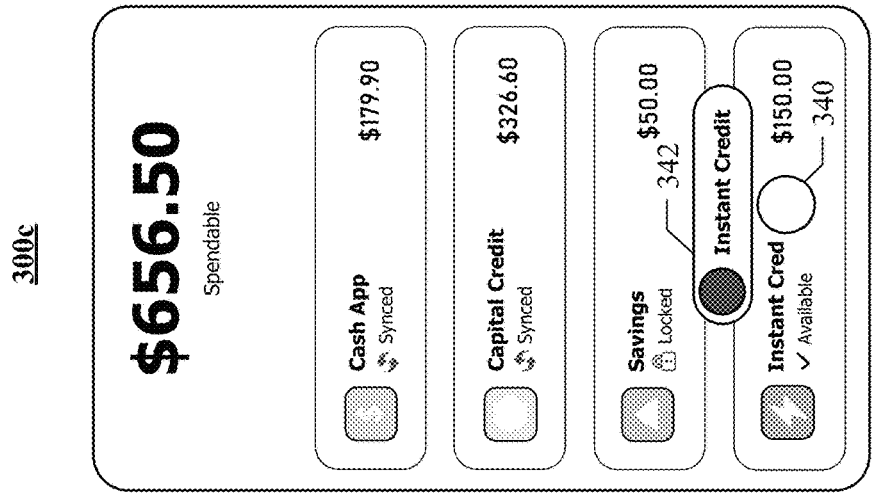
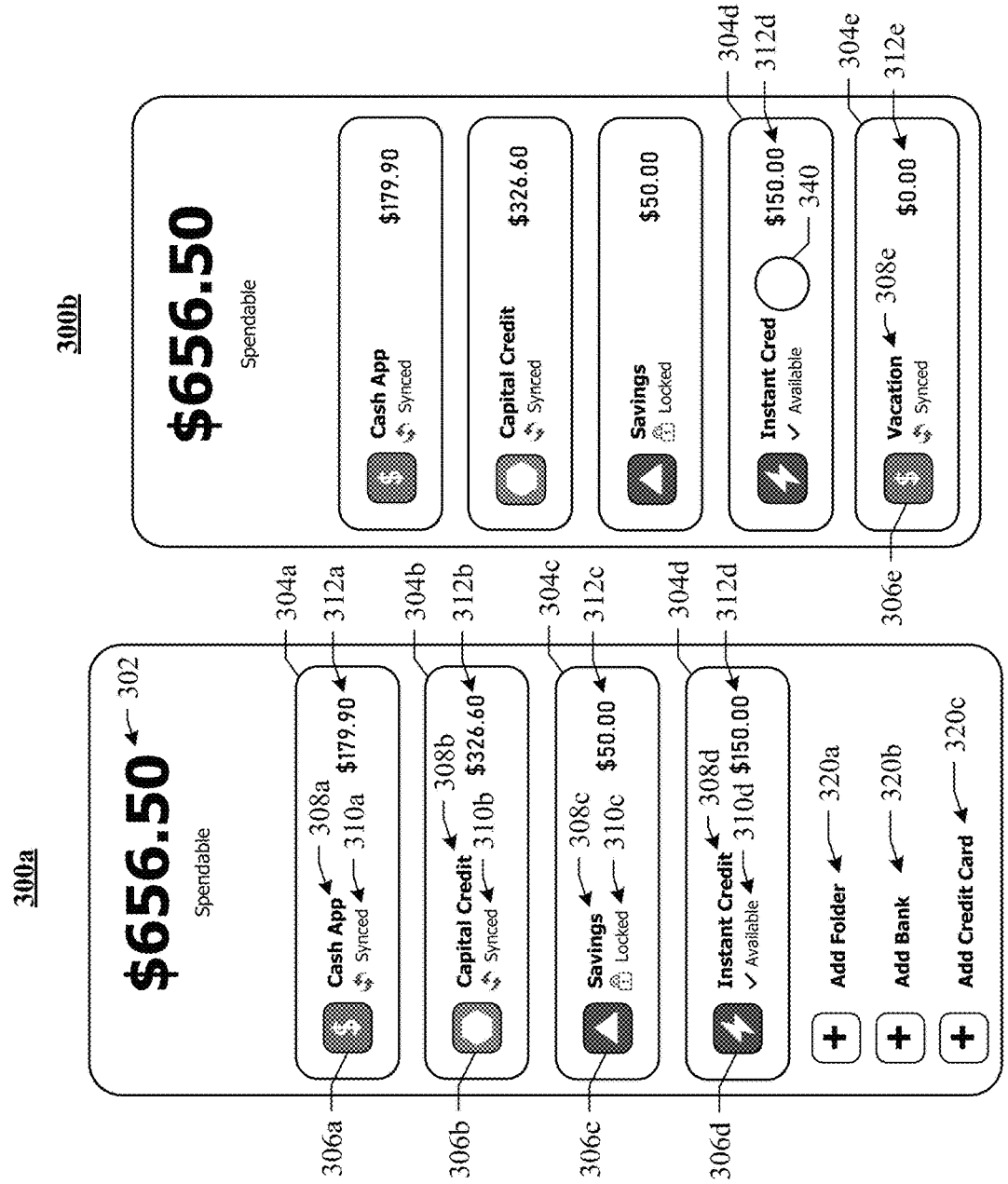
FIG. 3A  FIG. 3B  FIG. 3C

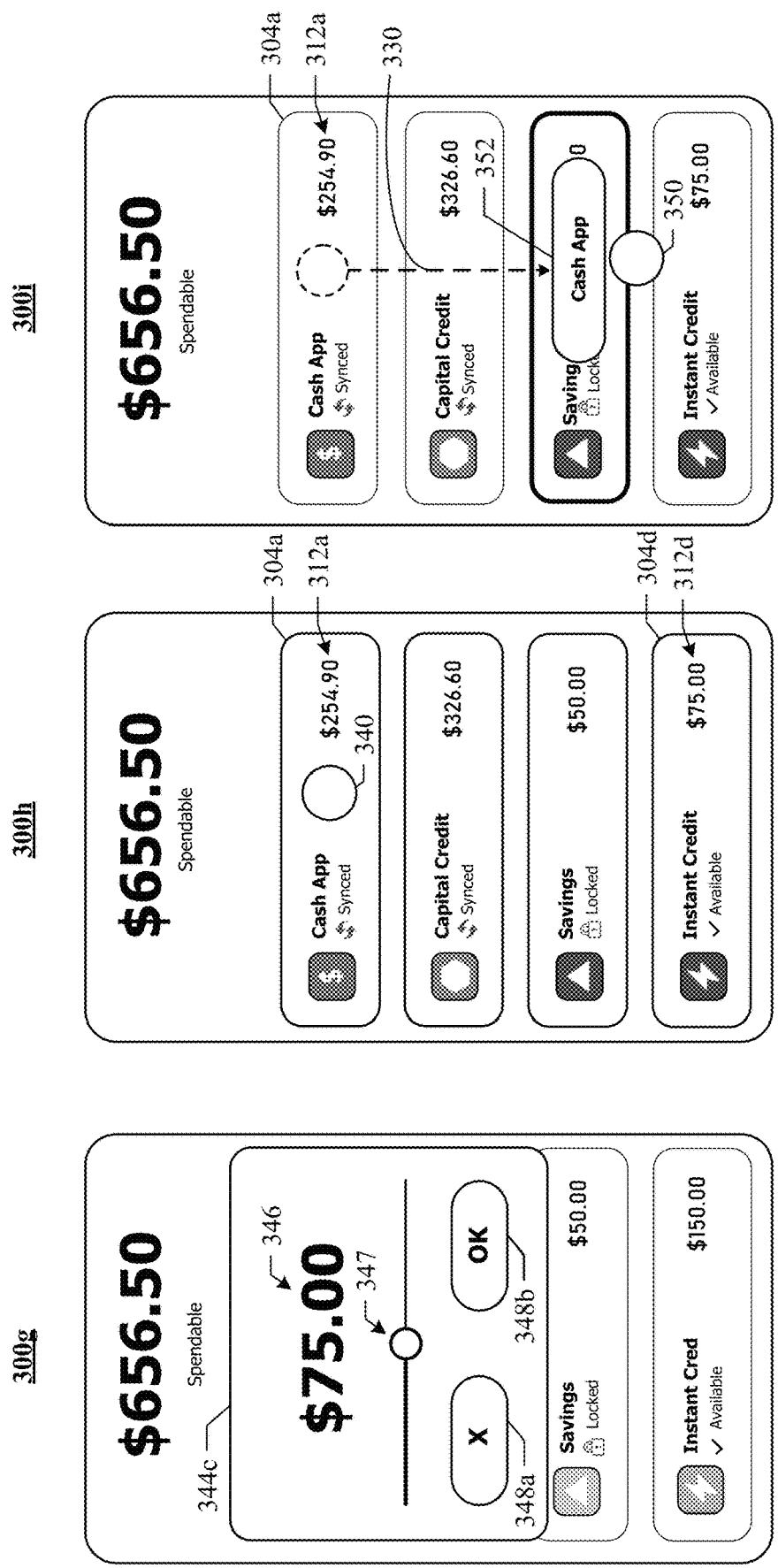

GESTURE AND CONTEXT INTERPRETATION FOR SECURE INTERACTIONS

BACKGROUND

A financial-service provider may make provide online systems to enable its users to conduct financial transactions through the financial-service provider's website. The online system may connect to or be part of a transaction processing system or other computer systems operated by the financial-service provider. The web site may provide features such as viewing account balances, obtaining statements, checking recent transactions, and making payments. Access is usually through a secure web site using a username and password. Financial-service providers also use two-factor authentication using a security token or a second form of communication with the user, in addition to the web site. Using online banking services can be time-consuming and inconvenient, because of the need for authentication and the need to enter information such as account numbers to perform transactions between accounts of a single financial-service provider or between accounts of different financial-service providers.

BRIEF DESCRIPTION OF THE DRAWINGS

FIG. 3A illustrates an example user interface providing money folders.

FIGS. 3B-3D illustrate example user interface interactions displaying the process of initiating transfer of money between folders.

FIGS. 3E-3G illustrate an example user interface displaying an amount to be transferred between folders.

FIG. 3H illustrates an example user interface displaying money folders after money has been transferred.

FIG. 3I illustrates example user interface interactions displaying the process of initiating transfer of money between folders.

DESCRIPTION OF EXAMPLE EMBODIMENTS

Figure 1:
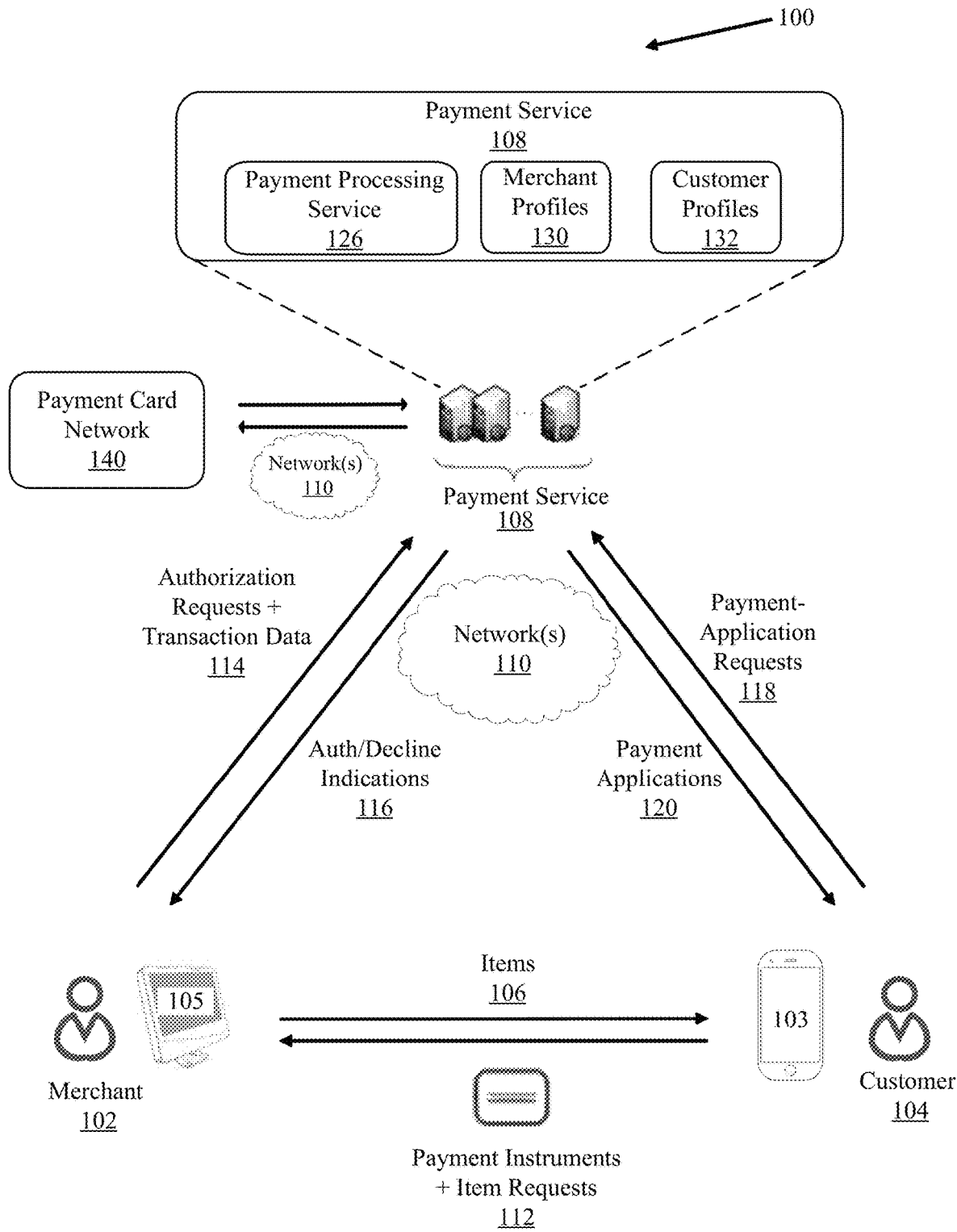
FIG. 1 illustrates an example system for processing payments.

In particular embodiments, a payment processing service may provide instructions to generate a money folder user interface (i.e., a graphical user interface) on a computing device. The money folder user interface may include a set of money folders that represent financial accounts that a user of the computing device may have at one or more banks. Each money folder may present information related to one or more corresponding financial accounts. A money folder may alternatively represent a sub-account or sub-balance of an associated financial account. The information presented may include a name and balance of the financial account(s) or portion thereof represented by the money folder. The financial accounts may include, for example, cash, checking, savings, or credit accounts. The user may interact with the money folders to cause corresponding transactions to, from, or between the financial accounts represented by the money folders. The transactions may include deposits to accounts, payments from accounts, and transfers of funds between accounts. As an example, a user may drag money between folders to transfer the money between the corresponding financial accounts. A suggested amount of money to be transferred may be presented to the user. The suggested amount may be determined using machine-learning techniques based on past transactions or expected needs for money in the financial accounts. The user may adjust the suggested amount if desired and confirm the transfer to cause the transfer to be performed between the corresponding financial accounts. Particular embodiments disclosed herein provide users of the money folder user interface improved experience by suggesting transfer amounts and other transactions using tools based on data science techniques, machine learning, and artificial intelligence. Additionally, particular embodiments provide an improved user interface with more efficient navigation when facilitating a transfer of funds between financial accounts. Prior solutions require a user to navigate multiple pages that must be subsequently rendered on the mobile device, in addition to requiring that users input a specific amount of funds desired for the transfer. In one example embodiment disclosed herein, upon detecting a user's intent to transfer funds to a separate account via the user interface, the proposed system may provide instructions to reduce the size of a displayed money folder icon so as to increase visibility of other displayed information on the user interface, and also generates a new UI object for suggesting specific transfer amount based on the user's previous actions involving the financial accounts. Accordingly, this present system provides a streamlined and more efficient user interface that reduces the number of processing steps (e.g., computational power for rendering multiple pages) necessary to facilitate funds transfer compared to prior solutions.

Furthermore, particular embodiments allow the payment service to further stimulate user interest in using the money folder user interface by providing novel user-interface features that are designed to cause tangible and positive user feelings.

The embodiments disclosed herein are only examples, and the scope of this disclosure is not limited to them.

Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example environment 100 that includes merchant 102 that conducts transactions with customer 104 (or "user 104") for items 106 offered by the merchant 102. FIG. 1 also illustrates a payment service system 108 (also referred to as "payment service"), coupled to merchant point of sale (POS) device 105 and customer device 103 via a network 110, to authorize payment instruments of customer 104. Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g. item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is "dipped" into the reader, such as chips that comply with the Europay, MasterCard, Visa (EMV) standard, i.e. EMV cards. In other examples, other types of payment instruments include cards or computing devices that communicate via radiofrequencies such as a radiofrequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service 108 over network 110, either substantially contemporaneously with the conducting of the transaction (in the case of online transactions) or later when POS device 105 is in the online mode (in the case offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132.

The payment processing service 126 may function to receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

Generally, when a customer and a merchant enter into an electronic payment transaction, the transaction is processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) may determine when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payment application, such as a mobile wallet application, from the payment service 108. FIG. 1 illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

Figure 2:
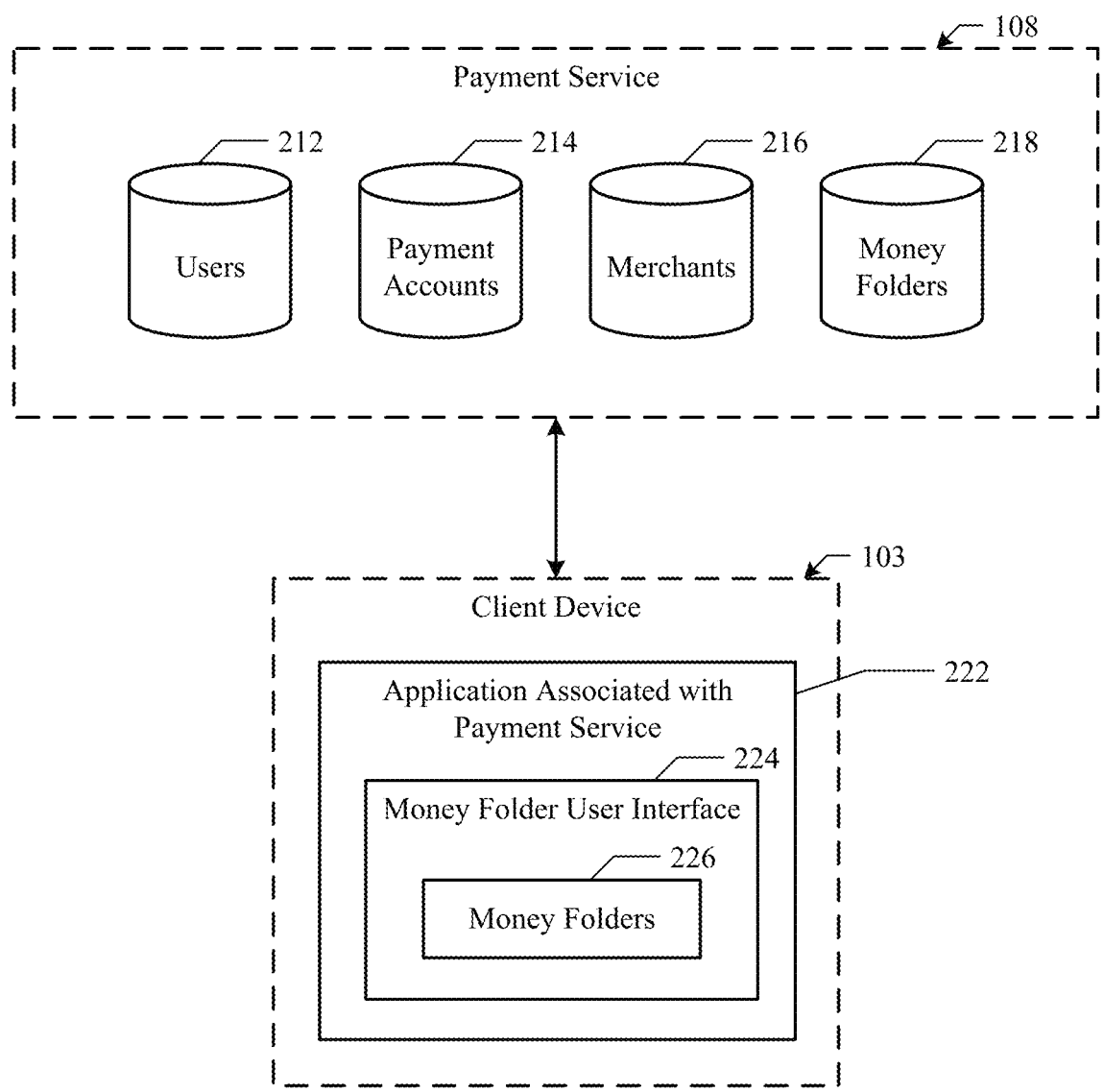
FIG. 2 illustrates an example system for providing a money folder user interface.

FIG. 2 illustrates an example system for providing a money folder user interface. In particular embodiments, the payment service system 108 may comprise one or more data stores. The data stores may comprise a data store 212 storing information associated with a plurality of users of the payment service. The information associated with a user may comprise biographical information, a transaction history comprising data about a plurality of transactions, a set of settings or preferences, a membership level or status, other suitable information, or any combination thereof. The data stores may comprise a data store 214. The data store 214 may store, for each of the users, information associated with a payment account issued by the payment service to the user. The payment account may be linked to one or more payment cards issued by the payment service to the user. A payment card may be represented by a physical card issued to the user. A user may make a payment using the physical payment card by, for example, swiping or inserting the card at a POS device. The payment card may also be represented by a card displayed in a user interface in a client device associated with the user. The user may directly make a payment using the virtual payment card (e.g., through near field communication (NFC) with a POS device using the user's mobile device). The data store 214 may store information about a balance or credit limit associated with the payment account, a usage history of the payment account, a type of the payment account, representations of money folders, other suitable information, or any combination thereof. The data stores may comprise a data store 216 storing information associated with a plurality of merchants. The information associated with a merchant may comprise biographical information, a location associated with the merchant, a type of business the merchant engages in, information about products or services offered by the merchant, a customer base of the merchant, customer reviews of the merchant, a transaction history, a history of promotions or offers, a rating, other suitable information, or any combination thereof. The data stores may comprise a data store 218 storing a plurality of money folders.

In particular embodiments, the payment service system 108 may assign each merchant a category or classification. The payment service system 108 may also reclassify a merchant based on additional information. The category or classification assigned to the merchant may be stored in data store 216.

In particular embodiments, the payment service system 108 may analyze information embedded in the payment events (also referred to as situational features), such as operating hours, busy times, physical locations, item type, price range, the route that a merchant takes for their business operations, the payment activity while on the route, and the temporal, geospatial, sequential, and spectral properties of payment activity, to name a few. Such analysis and subsequent representation of analyzed information allows rich segmentation of merchants into classes, including but not limited to MCC type classes.

Accordingly, queries such as "how does loyalty affect customer retention when there are similar sellers nearby?", "which geographic areas are experiencing the most growth or decline?", "where are nearby events (farmers markets, food truck fairs, etc.)?" can be answered. Broadly speaking, such analysis can be applied to additional problem areas, for example, MCC labeling, risk modeling, metrics benchmarking and establishment, churn detection, optimization, seasonality detection, account takeover, new buyer or seller targeting, loyalty rewards, market analysis and segmentation, viral adoption, and the like.

In one implementation, the techniques described herein classify merchants into machine classifications by comparing information associated with the merchant using various machine-learning models which may not completely rely on any rules-based programming instructions or algorithms.

In other implementations, the merchants are classified into a number of classifications by analyzing the information associated with the information with other data, such as historical trends, other merchant data, and so on, using statistical models such as predictive and heuristic models. The model from data variables is formed in the form of mathematical equations and algorithms.

Thus, in the techniques described herein, reclassification of a merchant can include classifying a merchant in a number of clusters and/or reclassifying a merchant to a new class based on situational features defined by payment signals and data from itemization, location, common buyers, dynamic fingerprinting, and other such features, to create a seller intelligence platform.

A class is generally and traditionally based on a merchant category code (MCC) assigned to the merchant by one or more entities or based on revenue generated by the merchant. For example, credit card companies, a payment processing system, and/or another entity may classify a merchant using one of various MCCs. A merchant can be assigned a MCC based on a type of items and/or services that the merchant provides. However, MCC or revenue-based classification is a one-dimensional and sometimes flawed way of merchant classification. MCC is a flawed framework for a few reasons. First, because MCC is self-reported during onboarding of the sellers, sellers are often mislabeled, possibly due to sellers' confusion.

In addition to unreliability due to self-reporting, traditional MCCs may not be rich enough to fully capture the contextual information about a seller, especially the seller's unique requirements (also referred to as Jobs) from the payment framework expressed, for example, through a 'Jobs To Be Done' (JTBD) framework. In the JTBD framework, the model factors not just the goods or service that is sold, but the situational features that define the Jobs a seller has. For example, a caterer and a T-shirt printer would be classified as 'food and drink' and 'retail' under MCC but may look very similar in terms of payment products used (invoices, mobile reader) and payment activity (infrequent CNP transactions with high dollar amount in a variety of locations). One of the largest MCCs is 'food and drink,' which really includes sellers with very different JTBD, for example quick-serve and full-serve restaurants. From both a JTBD (and credit risk) perspective, MCCs group some dissimilar sellers and fail to connect other similar sellers.

To this end, the embodiments described herein first, obtain situational features from the merchant's payment activity, for example based on spatio-temporal data points and/or itemization data, and second, analyze the situational features to enable richer merchant insights, classification or reclassification of a merchant in itemization topics, predicted MCCs, and JTBD clusters, where the JTBD clusters can have flexible boundaries, retention analysis, risk analysis, cross-sell, and the like. The classification or reclassification can be based on models that execute automation using one or a combination of heuristic statistical models, machine-learning models such as supervised and unsupervised models, and deep learning models.

Machine learning models are used to create cluster sellers, for example by JTBD, in a more intelligent way than the MCC and revenue-based segmentation. For example, in one implementation, the methods and systems implement a Latent Dirichlet Allocation (LDA) model to itemization data to create itemization topics and itemization names. Reclassification of sellers is then accomplished by executing a Random Forest Classification model that predicts a seller category based on real-time data and historical data. After engineering an intuitive set of contextual features that define a seller's JTBD, the system implements an unsupervised clustering algorithm that takes these features as input and outputs the seller's most probable cluster. These clusters can be correlated to MCC since most clusters have only one or two MCCs overrepresented but can also illuminate similarities across MCCs and differences within MCCs. For example, a cluster with high card not present transactions, mobile payments, payment a few times a day, and sole professionals might have mostly home and repair and professional services MCC. Another cluster might consist of only Quick Service Restaurants (QSRs), well defined by the payment activity, while some full-service restaurants (FSRs) might be clustered with retail sellers.

In another implementation, the systems and methods apply statistical models to form relationships between variables in the data in the form of mathematical equations. For example, the historical data is analyzed to extract temporal features, location-based features, sequential features, and spectral features emitted by the business in the course of their operations.

Deep learning models have been used for encoding contextual similarity between a variety of objects like words, images, drawings, and even 3D shapes. These models encode the complexity as a high-dimensional vector such as word2vec. Those vectors are extremely useful in that they define an immediately useful concept of similarity between objects. Things like 'coffee'~'cafe' or 'image of bicycle'~'image of unicycle.' In some implementations, deep learning models can be used to learn a vector representation of each merchant.

These vector representations are usually learned in a particular context, such as in the course of predicting a certain classification problem. The deep learning models can be used to influence the context by choosing what classes are learned to select, for example by using a soft max versus metric learning approach. The deep learning models can also be used to predict merchant type and take the learned vectors for more general use. Those vectors should encode similarity in terms of roughly what kind of business the seller does and learn these encodings in an unsupervised way. Such deep learning models, as described before, can be used to define "neighbors," and within what distance from the point do these neighbors lie. Furthermore, the models are used to cluster by discovering structure and pattern around the sellers. The models can be further improved by adding representation as features, adding clusters as categorical features and using clusters to impute data.

To identify the MCCs and JTBD clusters for a specific merchant, a payment service system 108 (and/or other service) can collect merchant signals for the merchant. Merchant signals for a merchant may include reported data, collected data, training data, and third-party data associated with the merchant. For example, the payment service system 108 can receive reported data from a point-of-sale (POS) device 105 of a merchant and/or an online merchant interface to the payment service system 108 that is accessible by the merchant. The reported data can indicate a selected class for the merchant, a business name of the merchant, a set of items offered by the merchant (e.g., inventory items), and/or a geographical location of the merchant.

The payment service system 108 can further receive collected data from the POS device 105 of the merchant. The collected data can indicate transactional information for the merchant, such as classes of items acquired by customers from the merchant and payment activity for the merchant. Payment activity for the merchant may include tips the merchant receives, ticket sizes for the merchant, volumes of item and/or service provided (e.g., sold, rented, leased, etc.) by the merchant, a time of day for providing items and/or services, or other sorts of data corresponding to transactions for the merchant.

The payment service system 108 can generate training data comprising (a) the stored historical transaction data; (b) an indication, for each historical purchase transaction, of whether the purchase transaction was ultimately determined to be fraudulent; and (c) a classification of a merchant associated with the transaction and/or business. For example, all transactions related to coffee may be the subject of a specific classification. In addition, for historical purchase transactions that were manually reviewed by human analysts, the training data may indicate whether the classification was changed from classification A to classification B.

Additionally, the payment service system 108 can receive third-party data associated with the merchant from one or more third-party services. For instance, the payment service system 108 can receive an email address for the merchant from an email service or provider (and/or POS device 105 of the merchant), merchant reviews for the merchant from a review service or provider (e.g., blogging service), and/or other sorts of third-party data associated with the merchant. The payment service system 108 can then generate a business profile for the merchant that includes the reported data, the collected data, and the third-party data, and use the data included in the business profile to classify the merchant in a class and/or reclassify the merchant to a new class.

For instance, the payment service system 108 can compare data in the business profile of the merchant to a collection of class profiles. Each class profile may be associated with a classification (e.g., MCC) and include data about the class and/or data about merchants that are assigned to the class. For example, the data may include one or more words that merchants assigned to the class commonly use in their business names (e.g., "pub" for merchants that are classified as bars). The data may further include a cluster of items associated with the class (e.g., items offered by the merchants assigned to the class, items acquired by customers from the merchants assigned to the class, etc.), payment activity for merchants assigned to the class (e.g., tips the merchant receives, ticket sizes for the merchant, volumes of items sold by the merchant, time of day for sales of items and/or services), and/or geographical locations of the merchants assigned to the class. The payment service system 108 can determine the data based on information that is common to the class and/or the payment service system 108 can receive the data from merchants that are assigned to the class.

In one implementation, in capturing the contextual features of a merchant, the methods and systems train an LDA topic model using sellers' itemization text to cluster sellers who provide similar goods and services.

In another implementation, in comparing data from the business profile of the merchant to the class profiles, the payment service system 108 can identify one or more class profiles that are similar to the business profile of the merchant. For example, the payment service system 108 can identify class profiles that include business names that are similar to the business name of the merchant. Similar business names can include one or more words that are common between the business names. For instance, the business name of the merchant may include the word "pub." The payment service system 108 can then identify class profiles that include merchants that also use the word "pub" in the merchants' business names. The payment service system 108 can then determine that the business profile of the merchant is similar to those identified class profiles.

For another example, the payment service system 108 can identify one or more class profiles based on the one or more class profiles including transactional information that is similar to the transactional information of the merchant. For instance, the payment service system 108 can identify class profiles that include the same and/or similar cluster of items as the cluster of items offered by the merchant, the same and/or similar cluster of items as the cluster of items acquired by customers from the merchant, and/or payment activity that is within a threshold value as the payment activity of the merchant. As discussed above, the payment activity for a merchant may include a percentage of tips that the merchant receives, ticket sizes for the merchant, and/or volumes of items customers acquire from the merchant.

For example, the payment service system 108 can identify class profiles that are similar to the business profile of the merchant based on the class profiles including a revenue that is within a threshold revenue (e.g., within a set percentage or range) as revenue of the merchant. For another example, the payment service system 108 can identify class profiles that include a number of tips (e.g., total tip amount and/or percentage of revenue that includes tips) that is within a threshold tip (e.g., within a set percentage or range) as a number of tips of the merchant. Additionally, the payment service system 108 can further perform similar methods to identify class profiles that include similar ticket sizes as the merchant and/or similar volume sizes of acquired items as the merchant.

When using a threshold to determine similarities between class profiles and the business profile of the merchant (and/or data included in the business profile of the merchant), the payment service system 108 and/or another entity can set a threshold value. For example, the payment service system 108 and/or other entity can set the threshold to include a specified percentage, such as 50%, 75%, 90%, 100%, or the like. For another example, the payment service system 108 and/or other entity can set the threshold to include a specified value range. For instance, when using revenue, the payment service system 108 can set ranges that include $100,000-$200,000 a month, $750,000-$1,000,000 a year, or the like.

The payment service system 108 can further use the third-party data to identify the one or more class profiles that are similar to the business profile of the merchant. For example, the payment service system 108 can determine classes of items acquired by customers from the merchant based on customer reviews that are associated with the merchant. The payment service system 108 can then use that determination to identify class profiles that include the cluster of items. For another example, the payment service system 108 can use the email address of the merchant to identify one or more class profiles that are similar to the business profile of the merchant. For instance, if the email address for the merchant ended with @myrestaurant.com, the payment service system 108 can determine that the merchant is a restaurant and use that determination to identity class profiles that are associated with restaurants.

After identifying the one or more class profiles that are similar to the business profile of the merchant, the payment service system 108 can either classify the merchant using a class corresponding to one of the class profiles or reclassify the merchant to a new class. When classifying and/or reclassifying a merchant with a class, the payment service system 108 can base the determination using one or more rules.

For instance, the payment service system 108 can use rules that select the class from the one or more identified classes based on fees charged to the merchant. For example, credit card companies and/or other entities may require the merchant to pay different rates (e.g., fees) based on which class (e.g., MCC) is assigned to the merchant. As such, the payment service system 108 can determine fees that will be charged to the merchant for each of the identified classes and rank the classes based on the fees. The payment service system 108 can then use a rule that selects the class that charges, for instance, the least amount of fees to the merchant.

Besides rules based on fees to the merchant, the payment service system 108 can implement a rule that prioritizes selection of certain classes over other classes. For example, if the payment service system 108 determines that a particular merchant may fairly be associated with a first class "restaurants" and a second class "bars", the payment service system 108 may select the more inclusive class, which in this case comprises the first class "restaurants".

Additionally, the payment service system 108 can allow the merchant to select a class from the one or more identified classes. For instance, the payment service system 108 can send a message indicating the identified classes to the POS device 105 of the merchant. The POS device 105 can then provide the merchant with an interface that includes the identified classes for selection. In response to a merchant selection of a class using the interface, the POS device 105 can then send a message indicating the selection to the payment service system 108 so that the payment service system 108 can classify and/or reclassify the merchant using the selected class.

In reclassifying a merchant, the payment service system 108 can perform the techniques described above at given time intervals. For instance, the payment service system 108 may continue collecting data associated with the merchant and update the business profile of the merchant using the data. The payment service system 108 can then use the data included the updated business profile of the merchant to determine whether the merchant is classified in the correct class at each given time interval. For example, the payment service system 108 can make the determination each week, month, year, or some other give time period.

Although the techniques described describe reclassifying the class of the merchant, the payment service system 108 can alternatively determine not to reclassify the merchant based on the identified class profiles. For instance, the payment service system 108 can determine that the current class of the merchant accurately represents the merchant. As a result, the payment service system 108 can determine not to reclassify the merchant into a new class.

Additionally, while the above provides classifying and/or reclassifying a single merchant to a class, the described techniques can classify and/or reclassify any number of merchants using the examples described above. For instance, the payment service system 108 may generate profiles for more than one merchant and compare each of the profiles to the class profiles associated with the various classes. The payment service system 108 can then identify one or more merchants that are classified in the wrong class and/or classified in a class that is not beneficial to the merchant. In response, the payment service system 108 can flag these merchants and either reclassify the merchants to a new class or provide the merchants with alternative classes for the merchants' selections.

Furthermore, while the techniques described above are illustrated as being performed by the payment service system 108, in other instances, the POS device 105 of the merchant can collect the data associated with the merchant, generate a business profile for the merchant using the data, compare the data included in the business profile of the merchant to the class profiles, and classify and/or reclassify the merchant based on the comparison. The POS device 105 can then send a message indicating the class to the payment service system 108 and/or another service (e.g., one or more credit card companies).

Even though the description herein uses classification and reclassification of merchants as an application, it will be understood that the systems and methods described herein can be implemented for other applications, such as risk modeling, establishment of metrics, churn detection, business operations optimization, detection of seasonality, account takeover, existing buyer targeting, new buyer targeting, loan or capital advancing, loyalty magnetism, retention analysis, merchant targeting with products, market analysis and segmentation, and viral adoption. To this end, instead of merchant classification, the machine learning model may look for some other kind of commonality and cluster the merchants or customers accordingly. Furthermore, even though the present subject matter uses payments as an example, the idea can be implemented in other fields such as advertising, marketing, banking and investments, just to name a few.

Furthermore, once the merchants are classified or understood in a contextual way, the use cases of the segmentation application include, but are not limited to: cross-selling to give a more granular way to sell the right products with highlights on particular features; differentiating between QSR and FSR within restaurants; applying reclassified MCCs for invoice financing, evaluate credit risk, e.g., cluster pre-sale merchants together, suggesting specific close of days by day of the week of merchants want their day's transactions batched into a single deposit, and other business vertical specific POS use cases.

Some implementations described herein implement machine learning models, while others implement heuristic models, and yet others implement a combination of the two. For example, in one implementation, both the models can be implemented and the results from the models compared and weighted to pick one or a combination of the results.

While some implementations described herein use payment activity as a basis for MCC classification, it would be understood that other factors may be used either in combination with payment activity or alone. For example, in one implementation third party data, such as data obtained by crawling a merchant's website can be used for merchant classification, especially when payment activity is under a threshold.

The methods and systems disclosed above describe an automated and more accurate classification within the merchant database thereby reducing the computing steps necessary for a merchant to classify their own business (e.g., multiple classification attempts) and the likelihood of an incorrect classification that may result in higher processing fee or violation of other legal requirements. For example, certain MCCs need to meet HIPAA requirements, etc., and the system described above detects the appropriate MCC based on payment behavior and not merchant's discretion. Also, since the credit card companies tie their rewards to MCCs, an incorrect classification may cause incorrect allocation of credit card points and rewards, but implementing the disclosed system and method helps alleviate such problems. Furthermore, present subject matter greatly reduces memory consumption through auto-reclassification in the event merchant was classified in multiple categories in the database. In another scenario, the present subject matter classifies in a category that changes dynamically as the merchant interacts with the payment service and customers. In yet another scenario, the same merchant can be in multiple clusters to allow the system to process the merchant's activity in multiple ways and through multiple perspectives. For example, in parallel, or substantially contemporaneously, the merchant may be presented with a product suggestion and a loan advance in response to the same transaction, because the merchant is classified in two seemingly different clusters.

In particular embodiments, the payment service may comprise data for provisioning an application 222 associated with the payment service for installation on a client device 103 associated with each of a plurality of users. The application 222 may be installed and operated on the client device 103 with request or permission by the respective user. The application 222 may communicate with the payment service system 108 via a network. The application 222 may provide various information for display in one or more user interfaces. The information displayed may comprise, for example, user information, account information, information about funds in a payment account, information about one or more social connections, information about one or more user settings or preferences, other suitable information, or any combination thereof. In particular embodiments, the application 222 may provide for display a virtual payment card issued to the user and associated with the payment account of the user. The virtual payment card may mimic the shape and form of a regular debit or credit card. The virtual payment card may also be displayed in any suitable shape, color, or size. The virtual payment card may correspond to a physical payment card issued to the user by the payment service.

In particular embodiments, the application 222 may include a money folder user interface 224. The money folder user interface 224 may provide for display one or more money folders 226. Each of the money folders 226 may correspond to one of the payment accounts 214. For example, one or more of the payment accounts 214 may be linked to one or more of the money folders 226. The linkage may be performed by the payment service 108 and the application 222, which may communicate information about the payment accounts 214 with each other via the network 110. Although FIG. 2 illustrate a particular system for providing payment cards and money folders, this disclosure contemplates any suitable system for providing payment cards and money folders.

Cash Money Folders

A money folder user interface of a computing device may present a set of money folders that represent financial accounts that a user of the computing device may have at one or more banks. Each money folder may present information related to the corresponding financial account. The information presented may include a name and balance of the financial account represented by the money folder. The financial accounts may include, for example, cash, checking, savings, or credit accounts. The user may interact with the money folders to cause corresponding transactions to, from, or between the financial accounts represented by the money folders. The transactions may include deposits to accounts, payments from accounts, and transfers of funds between accounts. As an example, a user may drag money between folders to transfer the money between the corresponding financial accounts.

In particular embodiments, one or more money folders may be displayed on a screen of the computing device as interactive user interface objects such as images, icons, text, or other media. One or more attributes of each folder, such as an account name, may be displayed as part of the interactive object. The attributes of a folder may include information related to the corresponding financial account, such as the financial account's balance. The attributes of each folder may include an account name and account balance, as well as an image or icon representing the account and state information about the account. The state information may include an indication of whether the account attributes displayed in the user interface, such as the balance, have recently been updated. The state information may also indicate whether the account is available for use and a type of the account, e.g., cash, credit, savings, or the like. Although the term "folder" is used herein to describe the interactive user interface objects, the term "folder" is not meant to limit the interactive objects to having characteristics that may be associated with the term "folder." For example, the folders described herein are not necessarily the same as the folders used to organize files in a computer system. In particular embodiments, the user interface may present a total available balance, which may be a sum of the available balances of the financial accounts represented by the money folders.

The user may interact with one or more of the money folders, e.g., using touch gestures or other suitable form of input, to request electronic transactions involving the financial accounts represented by the money folders. The transactions may be performed by, for example, a payment processing service 126. In particular embodiments, the money folders may be synchronized with the corresponding financial accounts. Changes made to a money folder in the user interface may be applied to the financial account, e.g., by performing transactions, and changes made to the financial account may be applied to the money folders.

A drag-and-drop interaction between two folders may cause a transaction, such as a money transfer, to occur between the corresponding two accounts. As an example, a folder named "Cash" may represent a demand deposit account (e.g., in a cash application), and a folder named "Savings" may represent a savings account (e.g., at a bank). The user may perform a drag-and-drop gesture from a Cash folder to a Savings folder to transfer money from the Demand deposit account to the Savings account. When a transfer operation is initiated, e.g., by a drag-and-drop gesture, a suggested amount of money to be transferred may be determined automatically, e.g., by the money folder user interface or by a payment processing system. The suggested amount may be presented to the user, e.g., in a pop-up dialog box, along with a user interface control for adjusting the amount to be transferred. The user may confirm that the suggested amount is to be transferred, e.g., by touching or clicking an OK button. Alternatively, the user may adjust the suggested amount, e.g., using a slider control, and then confirm that the adjusted amount is to be transferred. When a user confirms the transfer, the money transfer user interface may cause a message or other communication indicating the details of the transfer (e.g., the source and destination accounts and the amount) to be sent to a payment service system 108. The payment service system 108 may cause the transfer to be performed. After the transfer has been performed, the payment service system 108 may send a response message (or other communication) indicating success to the money transfer user interface. The response may include updated balances of the accounts involved in the transfer (e.g., the Cash and Savings accounts). The money transfer user interface may update the displayed account balances upon receiving the response message indicating success of the transfer. For example, if $25 is successfully transferred from the Cash folder to the Savings folder, then the displayed balance of the Cash folder may be reduced by $25 and the displayed balance of the Savings folder may be increased by $25. The transfer is simple for the user to perform, since the user interface interaction is in a single user interface (and ordinarily between folders that are both displayed on a device's screen at the same time). The transaction may appear to complete instantaneously. Alternatively, the money transfer user interface may update the displayed account balances prior to receiving the response indicating success and undo the update if a subsequent message is received indicating that the transfer did not succeed.

Previous user interfaces for transferring money between different financial accounts (that may be a different banks) are more time-consuming and require more user interactions than the money folder techniques disclosed herein. For example, previous money-transfer user interfaces may require a user to select a money transfer operation, select an account to transfer from, select an account to transfer to, enter an amount to transfer, and confirm the transfer. Further, if the transfer is between accounts at two different banks, the updated balances of both accounts may not be shown in previous money-transfer user interfaces.

FIG. 3A illustrates an example money folder user interface 300a providing money folders 304 that represent financial accounts. The user interface 300a may be displayed via the application 222 provisioned by the payment service system 108 and may correspond to the money folder user interface 224 shown in FIG. 2. The user interface 300a may comprise one or more money folders 304, each of which may correspond to a financial account associated with a user 104. Each money folder 304 may be, for example, an interactive user interface element displayed in the user interface 300a on a display screen of a client device 103 and may be responsive to input received via a touch screen, mouse, keyboard, or other input device. Each money folder 304 may comprise an icon 306 representing a type of account linked to the money folder 304, a folder name 308, a status indicator 310, and a balance 312.

As an example, and not by way of limitation, a cash money folder 304a represents a demand deposit account, which may be managed by a cash application ("Cash App"). The cash money folder 304a includes a folder name 308a ("Cash App"), a demand deposit icon 306a, which visually indicates that the money folder 304a represents a demand deposit account, a balance 312a ("$179.90") which represents an available balance of the demand deposit account, and a status indicator 310a ("Synced"), which indicates that the cash money folder 304a has been synchronized with the corresponding demand deposit account and information displayed in the cash money folder 304a, such as the balance 312a, is up-to-date, e.g., reflects the most recent information associated with the demand deposit account.

As an example, and not by way of limitation, a credit card money folder 304b represents a credit card account. The credit card money folder 304b includes a folder name 308b ("Capital Credit"), a credit card account icon 306b, which may be a logo of a bank that issued the credit card or an icon associated with credit card accounts, a balance 312b ("$326.60") which represents an available balance of the credit card account, and a status indicator 310b ("Synced"), which indicates that the money folder 304b has been synchronized with the corresponding credit card account, and information displayed in the money folder 304b is up-to-date.

As an example, and not by way of limitation, a savings money folder 304c represents a savings account. The savings money folder 304c includes a folder name 308c ("Savings"), a savings account icon 306c, which may be a logo of a bank associated with the savings account, or an icon associated with savings accounts, a balance 312c ("$50.00") which represents a balance of the savings account, and a lock status indicator 310c ("Locked") that includes a locked icon (an image of a closed lock), which indicates that the money folder 304c is in a locked state. Because the money folder 304c is in a locked state, the monetary funds in the savings money folder 304c are unavailable for use, e.g., for transfer to other money folders or for making payments. Further, since the money folder 304c is in a locked state, the balance ($50.00) of funds in the money folder 304c are not included in the spendable balance 302. When the money folder 304c is in an unlocked state, the balance of funds in the money folder 304c is included in the spendable balance and is available for use. A user may change the lock status of the money folder 304c to an unlocked state, e.g., by tapping or otherwise selecting the Locked status indicator 310c. When the money folder 304c is in the unlocked state, the status indicator 310c may display the status as "Available" and the lock icon may change to indicate that the money folder 304c is unlocked (e.g., by changing to an image of a check mark or other suitable object). Although the lock status is shown for the savings account money folder 304c, the lock status may be associated with any money folder 304, e.g., the credit card money folder 304b, so that the balance of any money folder 304 may be made unavailable for use until the folder is unlocked. Further, although not shown, the status indicator 310c may also indicate that the money folder 304c has been synchronized with the corresponding account, and information displayed in the money folder 304d is up-to-date.

As an example, and not by way of limitation, an instant credit money folder 304d represents an instant credit account. The instant credit money folder 304c includes a folder name 308d ("Instant Credit"), an instant credit account icon 306d, which may be a logo of a bank that issued the instant credit or an icon associated with instant credit accounts, a balance 312d ("$150.00") which represents an available balance of the instant credit account, and a status indicator 310d ("Available"), which indicates that the balance ($150.00) of the money folder 304c is available for use. Further, although not shown, the status indicator 310d may also indicate that the money folder 304d has been synchronized with the corresponding account, and information displayed in the money folder 304d is up-to-date.

The user may select one or more of the money folders 304 (e.g., 304a, or 304a and 304b) and interact with the user interface 300a, e.g., drag up or down to another money folder, to transfer at least a portion of the balance of the one or more selected money folders 304 to the other money folder. The user interface 300a may further comprise a prompt indicating an amount of money to be transferred and providing a slider or other input user interface element for changing the amount of money to be transferred. Although four money folders 304 are shown in the example user interface of FIG. 3A, there may be different money folders 304 in different examples. Although the money folders 304 are shown as user interface elements having rectangular shapes, the money folders 304 may be presented as user interface elements having any suitable shape or appearance, e.g., as user interface elements that include images of paper file folders or other objects.

In particular embodiments, the financial accounts associated with the money folders 304 may include, for example, payment accounts, such as the payment accounts for which information is stored in the data store 214 of the payment service 108 shown in FIG. 2. As another example, the financial accounts may include customer accounts maintained at a bank for electronic payments.

In particular embodiments, the user interface 300a may comprise a spendable balance indicator 302 representing an amount of money available for spending. The spendable balance indicator 302 may display a sum of available balances 312 of the money folders 304. The spendable balance may exclude the balances of money folders 304 that have a locked status indicator 310, such as the Savings money folder 304c.

The money folder user interface 300a may include interactive elements 320, also referred to as buttons or options, that may be selected by a user, e.g., via a touch input, such as tapping a finger on a button, to cause a corresponding action. The user may use the interactive elements 320 to add accounts for subsequent linking to money folders. The interactive elements 320 include an Add Folder button 320a for adding (e.g., creating) a new folder, an Add Bank button 320b for adding information about a bank, and an Add Credit Card button 320c for adding information about a credit card. The user may provide information related to the account, such as a name of a financial institution (e.g., bank) that provides the financial account, an account number, and authentication information.

Figure 3F:
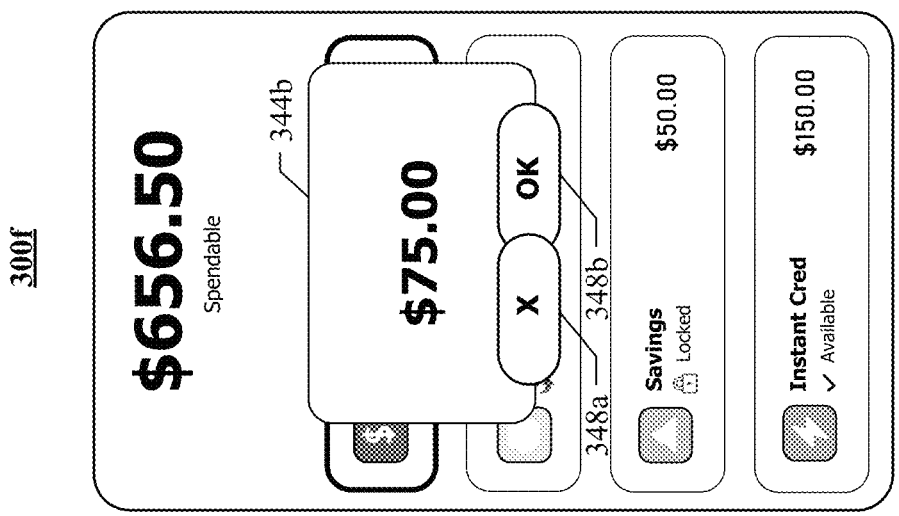
Figure 3E:
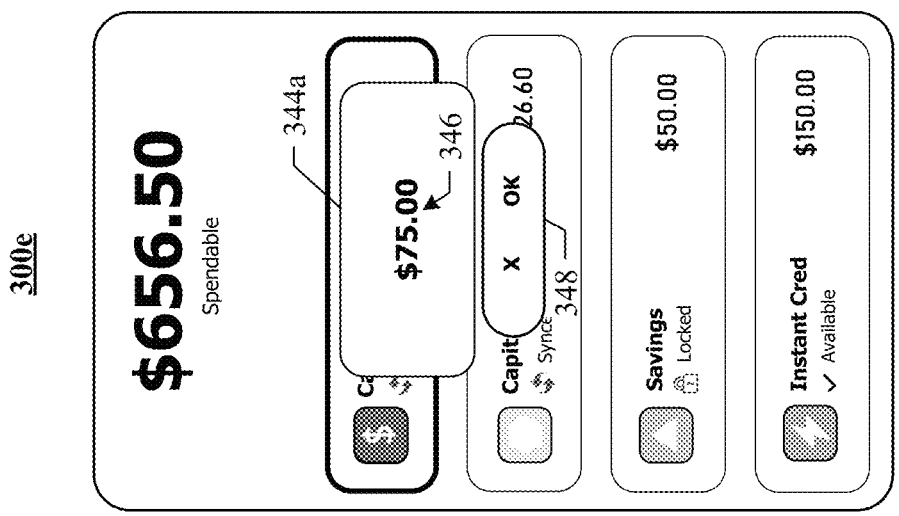
Figure 3D:
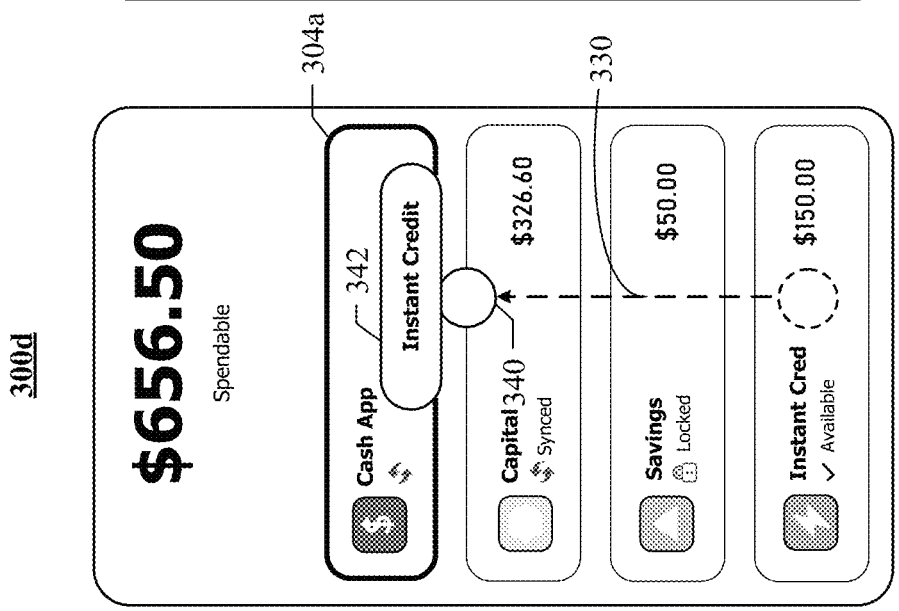

FIGS. 3B-3D illustrate example user interface interactions displaying the process of initiating transfer of money between folders, as depicted in corresponding money folder user interfaces 300. In particular embodiments, a money folder user interface 300 may allow a user to transfer funds between accounts using a drag-and-drop operation to drag a money folder 304 corresponding to a source account for the funds to a money folder 304 corresponding to a destination account for the funds. FIG. 3B illustrates an example user interface interaction in which a user initiates the money transfer process. To transfer funds from the instant credit folder 304d, a user may designate the source and destination money folders using one or more user interface interactions, such as drag-and-drop interactions (e.g., a multi-part gesture, such as a long press to select, followed by a sliding gesture to "drag," followed by a finger lift to "drop") or other gestures indicating the source and destination folders.

The user may select a source money folder 304d using one or more mouse inputs or touch-screen gestures. As an example, and not by way of limitation, to a user may initiate a drag-and-drop operation by pressing and holding a location 340 on the instant credit folder 304d. The location 340 may be the initial location of a drag-and-drop interaction, as indicated by directional arrow 330. As shown in FIG. 3C, an instant credit folder indicator 342, which may be a reduced-size user interface element having an icon or color associated with the instant credit money folder 304d, may be displayed at or near the location 340 to represent the money folder 304d from which funds are to be transferred. The instant credit folder indicator 342 may be displayed at or near the location 340 and may move based on the location of the user's finger or pointing device on the display screen. Thus, to transfer funds to the cash money folder 304a, the user may move their finger or pointing device from the location 340 to the cash money folder 304a, and the instant credit folder indicator 342 may follow the finger or pointing device's movement. This interaction is shown in FIG. 3D by a dashed arrow from the initial location 340 to a second location 340 on or near the destination cash money folder 304a. The second location 340 may be the drop location of a drag-and-drop interaction. A second location of the instant credit folder indicator 342, which is on the cash money folder 304a, is also shown in FIG. 3D. The user may complete the drag-and-drop interaction, e.g., by lifting the finger or pointing device from the touch screen at the second location 342, to indicate the destination money folder 304a to which funds are to be transferred. The destination money folder 304a may be the money folder 304 at the second location 342. The destination money folder 304a may be emphasized or highlighted in the user interface 300, e.g., by displaying an emphasized border on the destination money folder 304a. When the user completes the interaction designating the source and destination folders, the money folder user interface 300 may determine or identify a suggested amount of money to be transferred. The suggested amount of money may be determined using a machine-learning model trained on a transaction history associated with the user.

In particular embodiments, one or more suggested transactions may be generated and presented in the user interface. The suggested transactions may include suggestions for the user to perform or schedule as automatic transactions. The application 222 or the payment service 108 may identify suggested transactions based on patterns in a user's transaction history. The suggested transactions may be deposits to a folder, withdrawals or payments from a folder, or transfers between folders to be performed once or as recurring transactions. The suggested transactions may be identified using a machine-learning analysis of past transactions associated with one or more of a user's accounts. The machine-learning analysis use a machine-learning model trained on the transaction history of the user's accounts. Signals for training the machine-learning model may include attributes of the past transactions, such as each transaction's date and time, source financial account(s) and account type(s) (e.g., cash, checking, savings, credit card, instant credit, loan, gift card, rewards card, and so on), destination financial account(s) and account type(s), and monetary amount. Additional attributes may also be used as signals, such as whether the transaction was recurring, the time between occurrences, the relative amounts for each account if the source or destination of the transaction included multiple accounts, and the like. The trained machine-learning model may be used to predict the attributes of future transactions, such as the future dates and times, source and destination financial accounts and account types, monetary amounts, recurrence parameters, and so on.

As an example, if a user has made a transfer between two particular accounts every month for the past 3 months, then the application 222 may present the user with a suggestion to create an automatic monthly transfer between those accounts. The amount of the suggested transfer may be based on the amount of the user's past transfers. For example, if the user transferred $20 each time, or if the average of the transfers is $20, then the application 222 may suggest creating an automatic recurring transfer of $20 each month. If the user indicates acceptance of the suggestion (e.g., by tapping an OK option), then the application 222 may create the automatic recurring transfer. As another example, the machine-learning model training data may include anonymized data from other users of the application 222, such as transaction data from which the user identities have been removed. The anonymized training data may also include geographic locations associated with transactions. Based on the anonymized training data, the machine-learning model may generate insights based on locations of transactions and usage of the application across the network 110. Insights may be presented to the user by, for example, informing the user that people in the user's city save $20 per month on purchases, or that people in the user's area generally spend $42 on groceries every month.

FIG. 3B also illustrates a vacation money folder 304e includes a folder name 308e ("Vacation"), a vacation folder icon 306e, and a vacation folder balance 312e ("$0.00"). In particular embodiments, a user may create one or more money folders 304. Such user-created folders may be used for money organization, for example. The money folder user interface may provide a command or option to create a new money folder. For example, the user may provide an icon that the user may select to create a new money folder. The new folder may be linked to a particular financial account by default, e.g., the demand deposit account. Since the new folder maintains a balance of money separate from existing money folders, the new folder may be associated with a sub-account of a financial account, e.g., a sub-account of the demand deposit account. The balance of money in the new folder may be maintained in the sub-account. The user may select a different default financial account to which newly-created money folders may be linked. For example, the user may select a default financial account by selecting an icon for a default account change operation, and then selecting one of the user's financial accounts as the default account. The balance of money in the new folder may be maintained in a sub-account of the different default financial account.

As an example, a user may create a Vacation money folder 304e that represents a vacation savings fund. A user-created folder may be linked to the demand deposit account by default, though the user may link the folder to a different financial account. The user-created folder may be associated with a sub-balance or sub-account of the demand deposit account, and the balance of money in the user-created folder may be stored in the sub-account. To create a folder, the user may tap a create folder option (e.g., "Add Folder" button 320a), and provide a name for the folder (e.g., "Vacation"). The user created Vacation money folder 304e may be added to the list of money folders in the user interface. The initial balance of the Vacation folder is zero, though a different initial balance, and a source folder to fund the initial balance, may be specified by the user.

In particular embodiments, one or more money folders may be created automatically by the money folder user interface 300 for a user based on the user's financial accounts. For example, a money folder 304 may be created for each of the user's financial accounts. Alternatively, or additionally, the user may create one or more money folders and link the money folders to corresponding financial accounts. A user may link a money folder to a particular financial account by, for example, selecting an icon for a money folder account change operation. The icon may be displayed in association with each money folder, for example, so that a user may select the icon associated with a particular money folder to change the financial account associated with that money folder. After selecting the icon, the user may select the financial account (e.g., from a list of the user's financial accounts) to be linked to the money folder.

In particular embodiments, one or more automatic money transfer operations may be associated with a money folder. The automatic transfer operations may include automatically moving money into a folder at scheduled times, e.g., on a specified date, or a on a specified day of every month. An automatic transfer operation may be performed in response to an event, such as a physical card being swiped through a card reader. For example, each time a physical card is swiped to pay for a purchase, an additional amount of money based on the purchase price may be transferred to a designated money folder, such as a cash money folder 304a, a savings money folder 304c, a Vacation money folder 304e, or other money folder designated by the user. The additional amount of money may be determined by, for example, rounding the purchase price up to the nearest dollar (e.g., for a $5.30 purchase, the determined additional amount is $0.70), or as a percentage of the purchase price (e.g., 10% of the purchase price).

In particular embodiments, one or more rules may be associated with a money folder 304 to cause actions to occur when conditions are satisfied. The conditions may be based on variables that may correspond to input data and may be evaluated by the application 222 or the payment service 108. A rule may impose a cap on the amount of funds automatically transferred to or from a folder. Once a folder's balance reaches a limit, further transfers may be disabled until the folder's balance is no longer at the limit. For example, automatic transfers may continue until the balance of the destination folder reaches a specified limit, such as a $2000 limit on the Vacation money folder 304e. As another example, a rule may specify that if a folder's balance is or would become less than a specified lower limit, a transfer is to be performed automatically to move a specified amount of money to the folder from another specified folder. Another example rule may specify that when the temperature drops below 40 degrees Fahrenheit, $20 are to be moved into the user's winter clothing fund folder from the user's demand deposit account.

FIGS. 3E-3G illustrate example user interface interactions involved in transferring between money folders, as depicted in corresponding money folder user interfaces 300. As shown in FIG. 3E, a suggested amount 346 ($75.00 in this example) to be transferred may be displayed in a user interface element 344a, such as a text box or the like. According to one example, the suggested or recommended amount 346 may be immediately generated and presented in the user interface element 344a based upon previous transaction history associated with Instant Credit and/or the Cash app user account. Additionally, one or more buttons 348, such as an "OK" button to approve the suggested amount 346 and an "X" button to cancel the transfer, may also be displayed adjacent to or near the user interface element 344a. When the interaction designating the destination folder is completed, the user interface element 344a and buttons 348 may be enlarged and move forward towards a viewer. Elements of the user interface 300 other than the destination money folder 304a, the user interface element 344, and the buttons 348 may become blurry, reduced in brightness, or otherwise de-emphasized. The user interface element 344a, including the suggested amount 346, and the buttons 348 may be displayed in an animation such that their sizes increase and the suggested amount 346 appears to expand from a point in the destination money folder 304a to cover a larger portion of the user interface 300e during the animation, as shown by an expanded user interface element 344b, and expanded buttons 348a, 348b of FIG. 3F. When the animation ends, a further expanded user interface element 344c, the suggested amount 346, slider 347, and buttons 348a, 348b may be displayed as shown in FIG. 3G. The suggested amount 346 may be increased or decreased using the slider 347.

In this example, the user confirms the transfer by tapping the OK button without changing the suggested amount 346, and a transaction of monetary funds, transferring the confirmed amount ($75.00) from the instant credit account corresponding to the instant credit money folder 304d to the demand deposit account corresponding to the cash money folder 304a, may be performed. The transaction may be performed, e.g., in response to the user confirming the transfer.

FIG. 3H illustrates an example user interface displaying money folders after money has been transferred, as depicted in corresponding money folder user interface 300h. Elements of the user interface 300 may return to their normal position, size, clarity, brightness, and emphasis after the transfer is complete, as shown in FIG. 3H. Although this disclosure describes and illustrates particular animation effects associated with transferring money between folders, this disclosure contemplates any suitable animation effects associated with any suitable functionalities or user interactions. As a result of the example transfer, the balance of the instant credit account (shown in the instant credit money folder 304d) decreases by $75.00 to $75.00, and the balance of the demand deposit account (shown in the cash money folder 304a) increases by $75.00 to $254.90. These updated balances are shown in FIG. 3H.

FIG. 3I illustrates example user interface interactions displaying the process of initiating transfer of money between folders, as depicted in corresponding money folder user interfaces 300i. The interactions shown in FIG. 3I initiate a transfer from the cash money folder 304a to the savings money folder 304c but are otherwise similar to the interactions shown in FIG. 3D (which are for a transfer from the instant credit money folder 304d to the cash money folder 304a). The interaction in FIG. 3I, which is shown by a dashed arrow from an initial location (shown by a circle) to a second location 350 on or near the destination money folder 304c. The second location 350 may be the drop location of a drag-and-drop interaction. A location of the cash folder indicator 352, which is on the cash money folder 304a, is also shown.

Figure 3L:
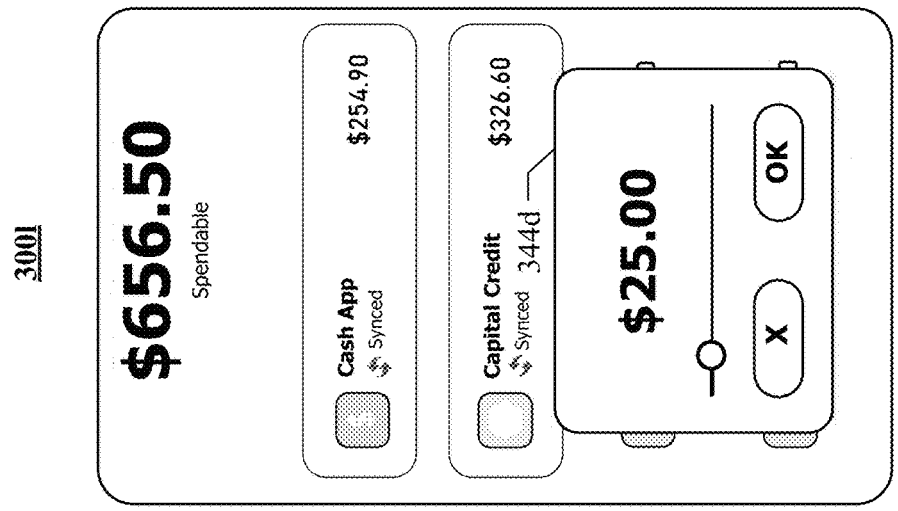
FIGS. 3J-3L illustrate example user interface interactions displaying the process of adjusting an amount to be transferred between folders.
Figure 3K:
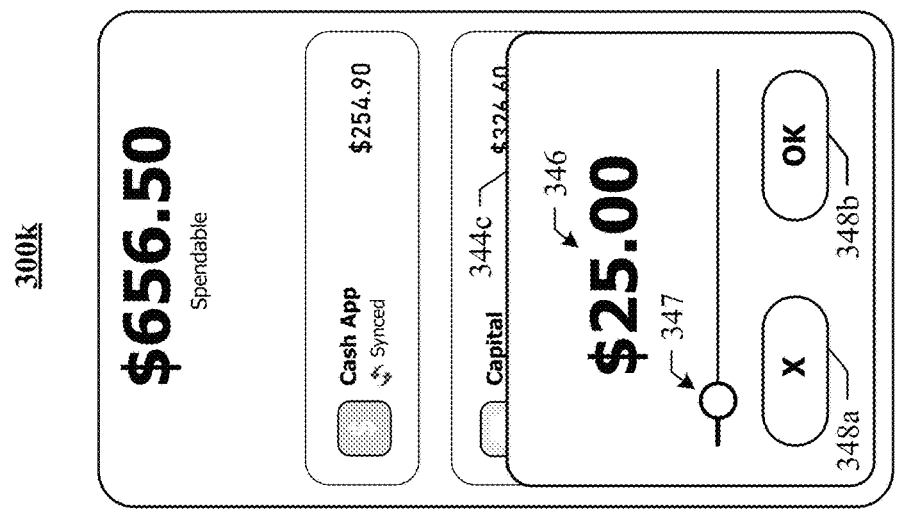
Figure 3J:
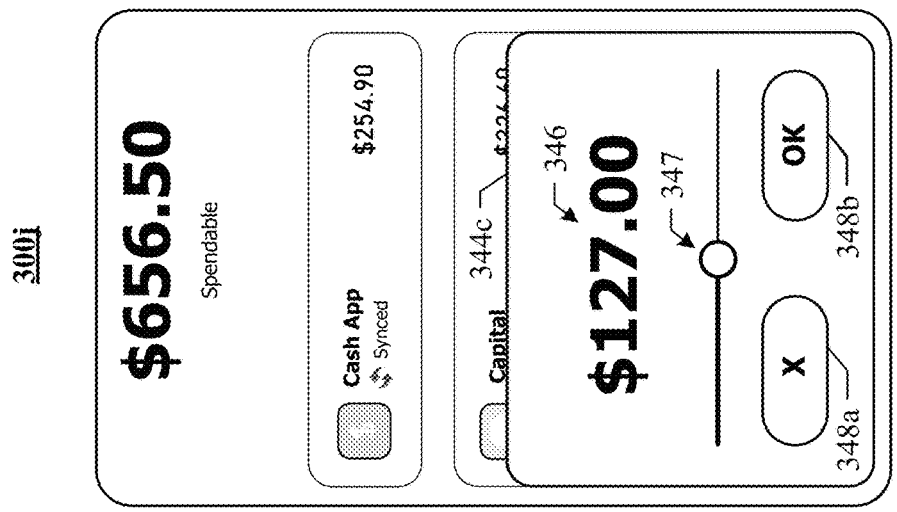

FIGS. 3J-3L illustrate example user interface interactions displaying the process of adjusting an amount to be transferred between folders, as depicted in corresponding money folder user interfaces 300. An amount 346 to be transferred ($127.00) is shown in FIG. 3J. The amount 346 is shown in a user interface element 344c that includes a slider 347 and buttons 348. The amount 346 may be a suggested amount determined as, for example, 50% of the balance of the source account. The slider 347 may be used to increase or decrease the amount 346 to be transferred. As an example, the slider 347 may be moved to the left to reduce the amount 346 (to $25.00). In this example, the user taps an OK button 348b to confirm that the reduced amount 346 is to be transferred. In response to the confirmation, an animation may be displayed in which the user interface element 344c is reduced in size to a user interface element 344d and disappears to a point in the destination money folder 304c, as shown in FIGS. 3K-L, in the reverse of the animation of FIGS. 3E-G (in which the user interface element 344 is increased in size).

Figure 3N:
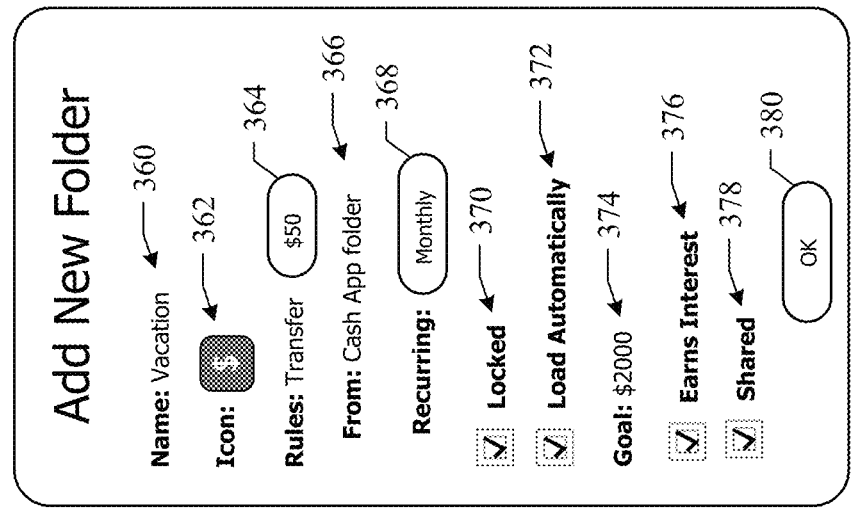
FIG. 3N illustrates an example user interface for adding a money folder.
Figure 3M:
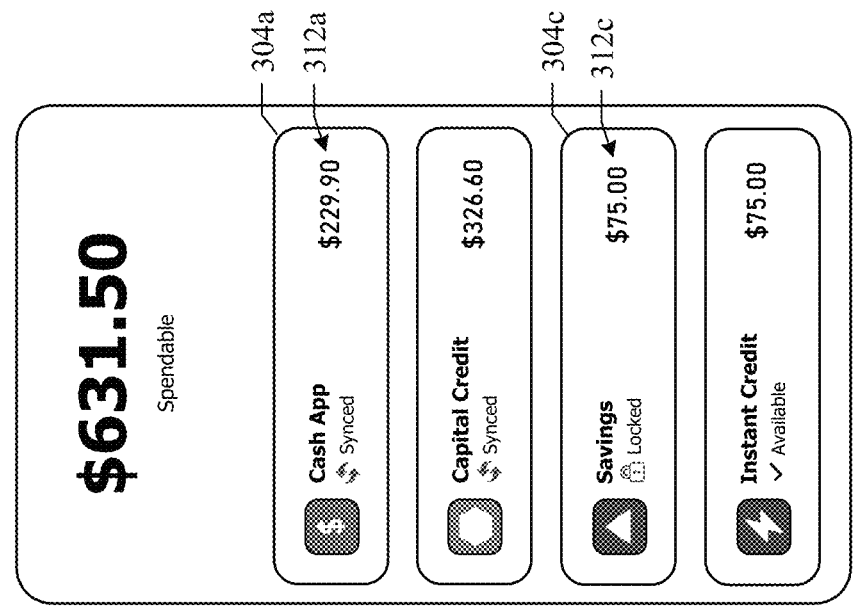
FIG. 3M illustrates an example user interface displaying money folders after money has been transferred.

FIG. 3M illustrates an example user interface displaying money folders after money has been transferred, as depicted in corresponding money folder user interface 300m. Elements of the user interface 300 may return to their normal position, size, clarity, brightness, and emphasis after the transfer is complete, as shown in FIG. 3M. As a result of the example transfer, the balance of the demand deposit account (shown in the cash money folder 304a) decreases by $25.00 to $229.90, and the balance 312a of the savings account (shown in the savings money folder 304c) increases by $25.00 to $75.00. In this example, the spendable balance decreased by $25.00 to $631.50 because the $25.00 moved to the savings account money folder 304c is not spendable while the money folder 304c is locked.

FIG. 3N illustrates an example user interface 301 for adding a money folder. A user may tap on the Add Folder button 320a to cause the user interface 301 to be presented. The user may then provide information about the new folder in the user interface 301, and the new folder may be added to the folders 304. For example, the information shown in the user interface 301 is for a Vacation money folder 304e that represents an account in which money may be saved for a vacation. The add folder user interface 301 includes input fields that prompt the user for the attributes of the new folder. The input fields include a folder name field, for which the user has provided the name "Vacation" 360, and a folder icon field, for which the user has selected a cash icon 362. A financial account may be associated with the new folder automatically based on the selected icon 362 (e.g., a demand deposit account), or a financial account may be associated with the new folder by the user via a subsequent user interface operation after the folder has been created.

The input fields also include a rules field, for which the user has selected an automatic transfer rule. The user has selected a transfer amount 364 ("$50"), a transfer source 366 ("Cash App folder"), and a transfer frequency 368 ("Monthly"). The input fields also include a locked field 370, which the user has checked to indicate that the folder is to initially be locked, a load automatically field 372, which the user has checked to indicate that account information, such as the account balance, is to be automatically loaded, and a goal field 374 ("$2000") in which the user has provided a balance at which the recurring transfer rule is to stop. The input fields further include an earns interest field 376, which the user has checked to indicate that the financial account associated with the new folder earns interest, and a shared field 378, which the user has checked to indicate that the new folder is to be shared with at least one other user. The user may tap an OK button 380 to cause the new folder to be added and made available in the list of folders shown in a money folder user interface 300, such as the interface 300b of FIG. 3B, which includes a Vacation money folder 304e. Although particular input fields for particular money folder attributes are shown in this example, money folders may have any suitable attributes, and a user interface for adding money folders may have any suitable input fields and input field value.

Figures 4A, 4B, 4C:
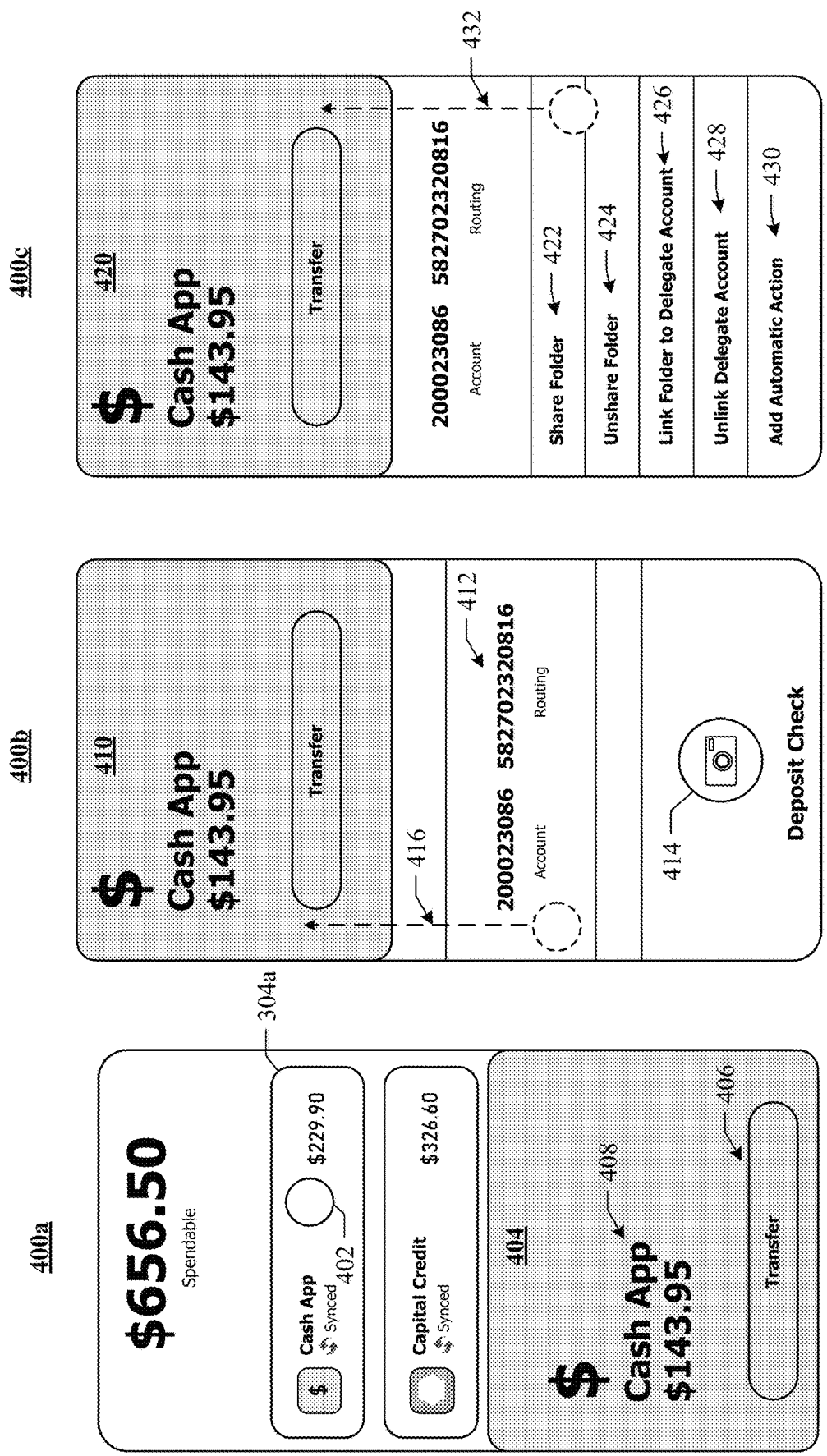
FIG. 4A illustrates example user interface interactions that cause details of a cash folder to be displayed.
FIGS. 4B and 4C illustrate example user interfaces displaying details of a cash folder, and operations that may be performed on the folder.

FIG. 4A illustrates example user interface interactions that cause details of a cash folder to be displayed. In particular embodiments, a user may tap or otherwise select a cash money folder 304a to cause details of the cash money folder 304a to be displayed. For example, the user may tap or press a location 402 on the cash money folder 304a to display cash folder details 404. The cash folder details 404 include a folder name 408 ("Cash App"), a balance ("$143.95"), and a transfer button 406, which the user may select to cause a transfer of funds to or from the cash money folder 304a. Further details of the cash money folder 304a may be displayed in response to a swipe gesture, e.g., a swipe up gesture that begins at a location on the folder details 404. The user may swipe upward, for example, to cause the folder details to scroll in an upward direction, thus displaying further details.

FIGS. 4B and 4C illustrate example user interfaces 400a-c displaying details of a cash folder, and operations that may be performed on the folder. The details shown in FIGS. 4B and 4C may be displayed in response to gestures 416 and 432 (e.g., swipe gestures), which are shown as dashed arrows. In FIG. 4B, the folder details 410 have scrolled upward, and additional details including account information 412 (a bank account and routing number) and a deposit check feature are shown. A user may tap a camera icon 414 to deposit a check by taking photo of the check with a camera of the device 103. In FIG. 4C, the folder details 420 have scrolled upward, and a list of operations 422-430 that may be performed on the folder are shown. The user may select one or more of the operations 422-430, e.g., by tapping on or near the text displaying the name of the operation. A Share Folder operation 422 may be selected to share the money folder 304a with one or more other users. An Unshare Folder operation 424 may be selected to stop sharing the money folder 304a with one or more other users. A Link Folder to Delegate Account operation 426 may be selected to associate the money folder 304a with a delegate account, e.g., an account of another user. An Unlink Delegate Account operation 428 may be selected to remove an association between the money folder 304a and a delegate account. An Add Automatic Action operation 430 may be selected to add an automatic action, such as a recurring transfer, for the money folder 304a.

In particular embodiments, the user may move money into a folder by dragging money into the folder from other folders, or by creating a recurring transfer. The recurring transfer may specify a recurring amount of funds to be deposited, a total amount of funds to be deposited (after which the recurring transfer stops), a source folder for the funds, and a frequency of the deposit. A user may create a recurring transfer by tapping an option to add an automatic action associated with a folder. As an example, the user may tap the "Add Automatic Action" operation 430 displayed below the Cash App account 420, then select an option (not shown) indicating that the action is to be a recurring transfer. A user interface similar to the Auto Repay interface 714 shown in FIG. 7B may be presented, and the user may specify the frequency, recurring amount, total amount, and destination folder of the recurring transfer. For example, a user may create a recurring transfer that deposits $50 from the Cash money folder 304a to the Vacation money folder 304e every month until the balance of the Vacation folder reaches $2000. As another example, the user may create a recurring transfer that sends $20 every week to the Capital Bank folder to make a weekly payment of $20 to a credit card. If the source folder (e.g., the Cash folder) is associated with the same financial account (e.g., a Demand deposit account) as the destination folder (e.g., the Vacation folder), then an additional financial account may be created for the destination folder (e.g., another Demand deposit account). Although recurring transfers are described in this example as being used with user-created money folders, recurring deposits may be used with any money folders.

In particular embodiments, deposits of funds may be allocated automatically to one or more of the money folders 304. For example, a user may designate a particular folder, such as a cash or checking account folder, to receive deposits of funds. The particular folder may be designated by the user in the user interface, e.g., by tapping on an icon displayed on or near the folder to cause a menu of folder operations to appear, then selecting a menu item corresponding to an operation to designate a default folder to receive deposits. In this way, a folder need not be specified when the user deposits funds using the application 222.

In particular embodiments, multiple financial accounts may be linked to a money folder 304. If multiple accounts are linked to a folder, deposits of funds to the folder may automatically be divided among the accounts, so that a portion of the deposit is deposited in each account linked to the folder. The funds may be divided evenly or according to a ratio specified by the user. A user may create a recurring transfer that periodically sends a specified amount of money to a list of other accounts, users, or both. For example, the recurring transfer may be configured to send $20 every month to one of the user's friends. As another example, the recurring transfer may be configured to send $100 every month to a list of recipients that includes three other users and a bank account. This recurring transfer may automatically determine the amounts to be sent to each recipient (e.g., by dividing the amount by the number of recipients) send $25 to each of the other users and $25 to the bank account every month. Similarly, if multiple accounts are linked to a folder, withdrawals of funds from the folder may be automatically divided among the accounts, so that a portion of the withdrawal is taken from each of the accounts linked to the folder.

In particular embodiments, money folders may be shared among multiple users of the application 222. When a money folder is shared by a first user with second user, the money folder may be presented for display as one of the money folders 226 in the second user's instance of the application 222 on the second user's client device 103. The second user may access the folder similarly to other folders, subject to the access restrictions specified by the first user. The access permissions may indicate whether the second user can view the folder's balance, withdraw money from the folder (e.g., make payments), deposit money into the folder, or transfer money between the folder and other folders, for example. Changes made to the shared folder based on the second user's interactions with the folder, e.g., deposits, payments, or transfers, may be reflected in the first user's instance of the application 222 on the first user's client device 103, and vice-versa.

In particular embodiments, a first user may share a money folder with a second user by tapping an option (e.g., "Share Folder" 422 shown in FIG. 4C) associated with the folder in the user interface (e.g., the "Cash App" folder 420). The first user may specify the identity of the second user and, optionally, access permissions to restrict the second user's access to the folder. The shared folder may appear in the second user's instance of the application 222, which may notify the second user that the first user has shared the folder and query the second user as to whether to accept the shared folder. If the second user accepts the shared folder, then the shared folder may appear in the list of folders presented in the second user's instance of the application 222. Alternatively, the application 222 may add the shared folder to the list of folders presented in the second user's instance without querying the second user. The application 222 may provide an option to unshare a previously-shared folder ("Unshare Folder" 424). The user who shared the folder (e.g., the first user) may tap on this option to stop sharing the folder 420. Unsharing a folder may cause the folder to be removed from one or more specified users' instances of the application 222.

Figure 5:
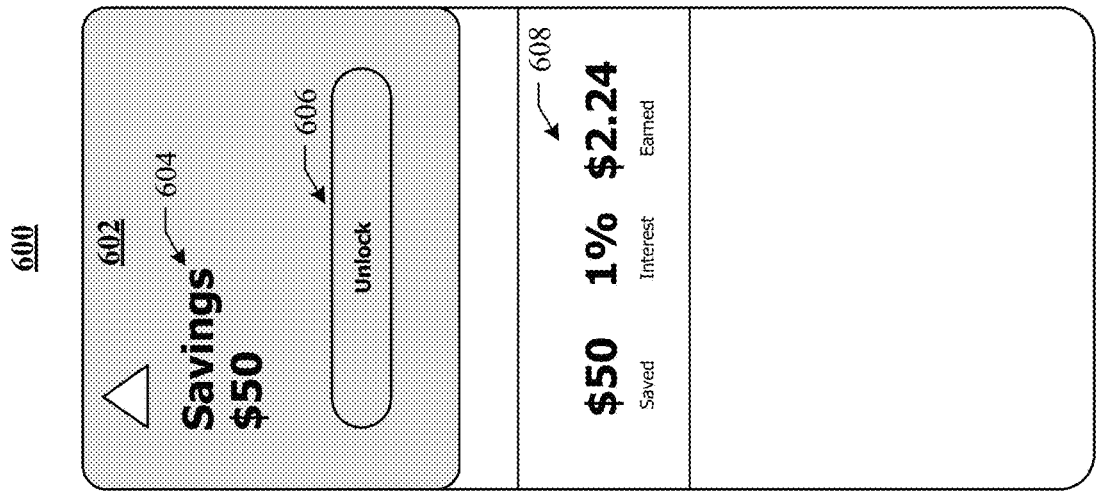
FIG. 5 illustrates an example user interface displaying details of a credit folder, and operations that may be performed on the folder.

FIG. 5 illustrates an example user interface 500 displaying details 502 of a credit folder, and operations that may be performed on the folder. The credit folder details 502 may be displayed in response to user interface interactions such as a tap on the credit money folder 304b, similarly to the interactions described above that may cause the cash folder details to be displayed. The credit folder details 502 include a folder name 504 ("Capital Credit"), a balance ("$326.60"), and a transfer button 506, which the user may select to cause a transfer of funds to or from the credit money folder 304b. The user interface 500 also includes an automatic transfer configuration interface. An enable switch 508 may be used to enable automatic transfers for the account (e.g., credit card) associated with the credit money folder 304b. A transfer frequency option 510 may be used to select a transfer frequency, e.g., daily, weekly, monthly, yearly, or the like. An amount option 512 may be used to select an amount of money to transfer. The amount selected in this example is $100. A destination option 514 may be used to select a destination folder for the transfer. The cash folder has been selected in this example. A list of operations 516-520 that may be performed on the folder are also shown. A Refresh Balance operation 516 may be selected to refresh (e.g., update) the displayed balance of the credit money folder 304b. An Enable Instant operation 518 may be selected to enable instant transfers to or from the account (e.g., credit card) associated with the credit money folder 304b. An unlink account operation 520 may be selected to remove the association between the account (e.g., credit card) and the credit money folder 304b.

Figure 6:
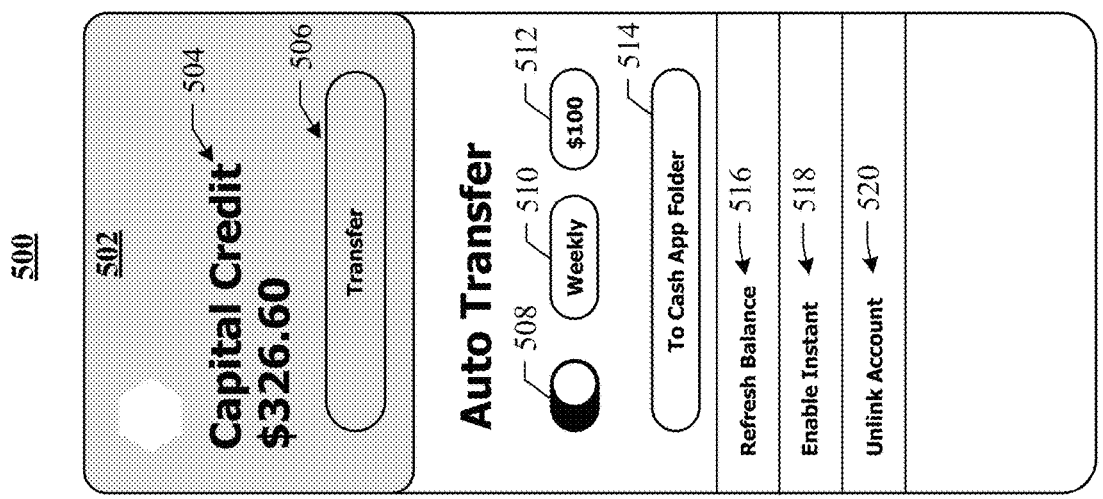
FIG. 6 illustrates an example user interface displaying details of a savings folder, and operations that may be performed on the folder.

FIG. 6 illustrates an example user interface 600 displaying details 602 of a savings folder, and operations that may be performed on the folder. The savings folder details 602 may be displayed in response to user interface interactions such as a tap on the savings money folder 304c, similarly to the interactions described above that may cause the cash folder details to be displayed. The savings folder details 602 include a folder name 604 ("Savings"), a balance ("$50"), and an unlock button 606, which the user may select to unlock the savings money folder 304c, thereby making the funds in the savings folder available for use, e.g., for transfer to other folders. The user interface 600 also displays account details 608, e.g., details about a savings account associated with the savings money folder 304c. The account details 608 include an amount saved ("$50"), an interest rate ("1%"), and an amount of interest earned ("$2.24").

Figures 7A, 7B:
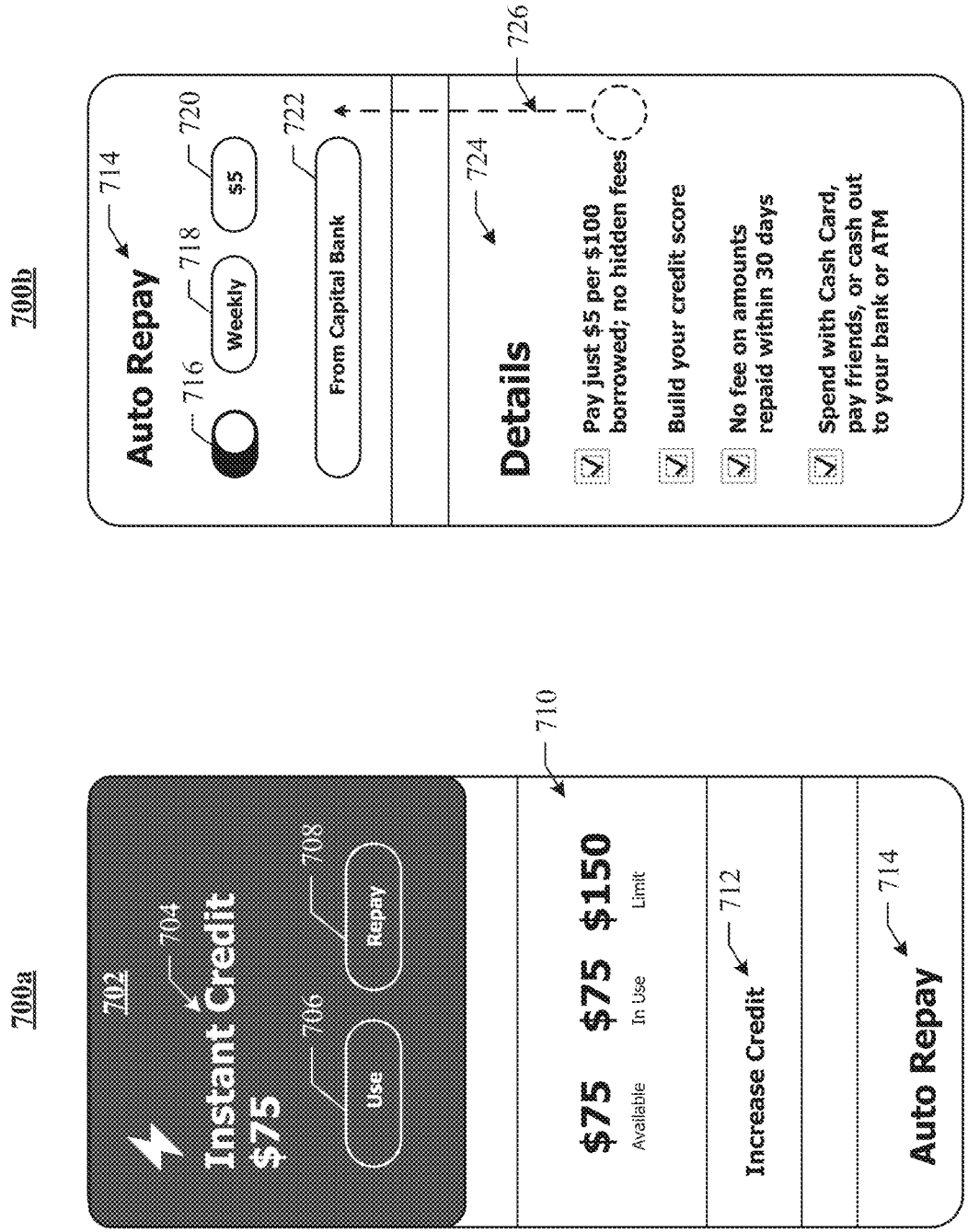
FIGS. 7A and 7B illustrate example user interfaces displaying details of an instant credit folder, and operations that may be performed on the folder.

FIGS. 7A and 7B illustrate example user interfaces 700 displaying details 702 of an instant credit folder, and operations that may be performed on the folder. As shown in an example user interface 700a, the instant credit folder details 702 may be displayed in response to user interface interactions such as a tap on the instant credit money folder 304d, similarly to the interactions described above that may cause the cash folder details to be displayed. The instant credit folder details 702 include a folder name 704 ("Instant Credit"), a balance ("$75"), a Use button 706, which the user may select to cause a transfer of funds from the instant credit money folder 304d, and a Repay button 708, which the user may select to cause a transfer of funds from another source (such as another money folder 304) to the instant credit account. The user interface 700 also displays account details 710, e.g., details about the instant account associated with the instant credit money folder 304d. The account details 608 include an amount available ("$75"), an amount in use ("$75"), and credit limit ("$150"). Example user interface 700a may include an interactive element 712 to request an increase in credit level, as well as an interactive form 714 to set up automatic repayment.

Further details about the instant credit account may be displayed, as shown in example user interface 700a of FIG. 7B. The user interface 700a may scroll upwards in response to a gesture 726 (e.g., a swipe gesture), which is shown as a dashed arrow. In FIG. 7B, the folder details 702 have scrolled upward, and additional details of interactive form 714 and additional details 724 are displayed. Interactive form 714 may include an interactive switch UI element 716 to enable or disable automatic repayment, a repayment scheduling option selector 718, installment amount option selector 720, and repayment source account selector 722.

In particular embodiments, an instant credit of a particular amount of funds may be granted to a user. The amount of instant credit may be determined based on attributes of the user, and may be any suitable amount, e.g., $5, $100, and so on. The instant credit may be provided in a designated instant credit folder, e.g., a folder named "Instant Credit." The instant credit folder may be presented in the user interface as one of the user's money folders. The amount of the instant credit (e.g., the amount of available credit) may be displayed as part of the instant credit folder. The instant credit may be used similarly to cash. The user may transfer funds from the instant credit folder to other folders or spend the instant credit using the same user interface operations as other folders such as the Cash folder. In particular embodiments, the amount of the instant credit may be a gift to the user as an incentive to try the instant credit folder. The amount of instant credit associated with the instant credit folder may be reduced by transfers out of the instant credit folder to other folders and may be increased by transfers into the instant credit folder from other folders. For example, the amount of instant credit may be reduced by deposit of a paycheck or a transfer from a repayment account into the instant credit folder. The repayment account may be linked to the instant credit account. The user may link another folder, e.g., a cash or checking money folder, to the credit account for use as the source of funds for payments to the credit account.

In particular embodiments, a user's folder may be linked to a delegate account, which may be an account of another user. A money folder linked to a delegate account may be referred to herein as a delegate folder. One or more rules may be associated with a delegate folder, such as rules that restrict spending from the delegate folder, rules that generate notifications when transactions or requests referencing the folder occur, or other rules that may limit transactions referencing the folder or cause actions to occur based on transactions referencing the folder. A delegating user may create a delegate folder and associate the delegate folder with a child's financial account, for example, to restrict and monitor transactions on the child's financial account. The delegate folder may be shared with the child (e.g., with the child's user account) so the child may access the folder in a user interface of an instance of the application 222 (e.g., using his or her computing device and user account). For example, a delegate folder named "Hannah's Account" may be shared with a child named Hannah. The delegate user, e.g., Hannah, may use the funds in the delegate folder according to rules associated with the delegate folder. Since the delegate folder appears in the instance of the application 222 used by the delegating user, the delegating user may monitor the child's account transactions, such as transfers into and out of the delegate account. Rules associated with the delegate account by the delegating user may specify that the account only works at specified locations, cannot be used to buy alcohol, cannot be used to make specified types of online purchases, can only be used during certain hours, and so on. The rules may be defined by the delegating user in the money folder user interface 224.

The rules may be used as parental controls for the delegate account, and the delegate account may be used to monitor at what times the delegate user is spending, what they are spending on, who they are sending money to, who is requesting money from them, and so on. The delegating user may specify a list of pre-approved users to or from whom the delegate user may send or receive money without obtaining permission for a transaction from the delegating user. A periodic allowance may be transferred to a child's account by creating a recurring transfer from a parent's account to the child's account, e.g., a transfer of $20 on the first of each month. Notifications of the delegate user's transactions may be presented to the delegating user's instance of the application 222 when the transactions occur.

In particular embodiments, the user interface may include a search feature for searching a user's money folders based on a specified query. For example, a user may search his or her folders for the text string "pizza" to find transactions having descriptions that include the word "pizza." The search feature may also search money folders of other users to which the user has access.

In particular embodiments, a Uniform Resource Locator (URL) may be associated with a folder, and a user who has access to the folder may share the URL with another user to provide access to the folder, or the account associated with the folder, to other users. The user interface may include a command to share a folder as a URL with deposit permission, in which case a user who receives the URL may deposit funds into the folder (or its associated account). The receiving user may access the shared folder via the URL in a money folder user interface of an application on a mobile device, in a web browser, or via another suitable user interface.

Figure 8:
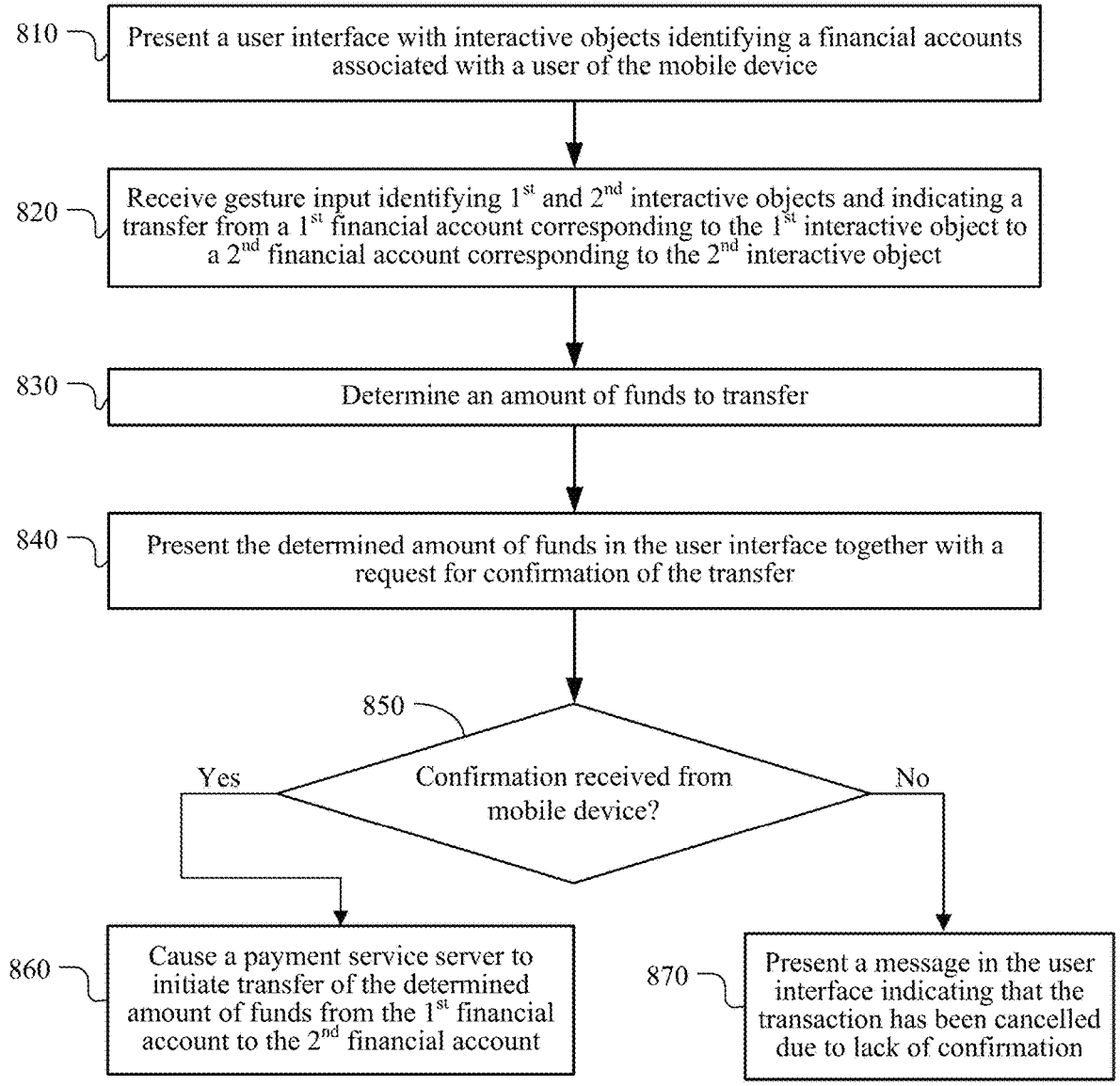
FIG. 8 illustrates an example method for providing money folders.

FIG. 8 illustrates an example method 800 for providing money folders. The method 800 may begin at step 810, where a client device 103 may provide for display a virtual payment card in a user interface of an application 222 running on a client device 103 of a user. The virtual payment card may correspond to a physical payment card issued to the user. The virtual payment card and the physical payment card may both be associated with a payment account of the user. At step 810, the client device 103 may present a user interface of a payment service application. The user interface may comprise a plurality of interactive objects identifying a plurality of financial accounts associated with a user of the mobile device. At step 820, the client device 103 may receive gesture input via the user interface of the payment service application, wherein the gesture input identifies first and second interactive objects and indicates that funds are to be transferred from a first financial account identified by the first interactive object to a second financial account identified by the second interactive object. At step 830, the client device 103 may determine an amount of funds to transfer from the first financial account to the second financial account. At step 840, the client device 103 may present the determined amount of funds in the user interface of the payment service application, together with a request for confirmation of the transfer. At step 850, the client device 103 may determine whether it has received, via the user interface of the payment service application, confirmation from the user to transfer the determined amount of funds from the first financial account to the second financial account. If yes, then at step 860, the client device 103 may cause a payment service server to initiate transfer of the determined amount of funds from the first financial account to the second financial account. If not, then at step 870, the client device may present a message in the user interface indicating that the transaction has been cancelled due to lack of confirmation input from the user. In some embodiments, the client device may wait for a prescribed period of time at step 850, and then move to step 870 once the period of time has expired. In some embodiments, the request for confirmation presented in step 840 may also present an option for the user to cancel the transaction, and in step 870, the message presented in the user interface may indicate that the user affirmatively cancelled the transaction. In some embodiments, the request for confirmation presented in step 840 may also present an option for the user to schedule the transfer at a later date, and at step 860, in addition to displaying a message indicating when the transfer will take place, initiation of the transfer will be delayed to a particular time on the specified later date. In some embodiments, the request for confirmation presented in step 840 may also present an option for the user to defer confirmation of the transfer until a specified later date, and prior to step 850, the payment app may cause a reminder to be displayed on the mobile device, requesting user confirmation of the transfer at the specified later date.

Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for identifying reward offers and connecting reward offers to a payment card including the particular steps of the method of FIG. 8, this disclosure contemplates any suitable method for identifying reward offers and connecting reward offers to a payment card including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
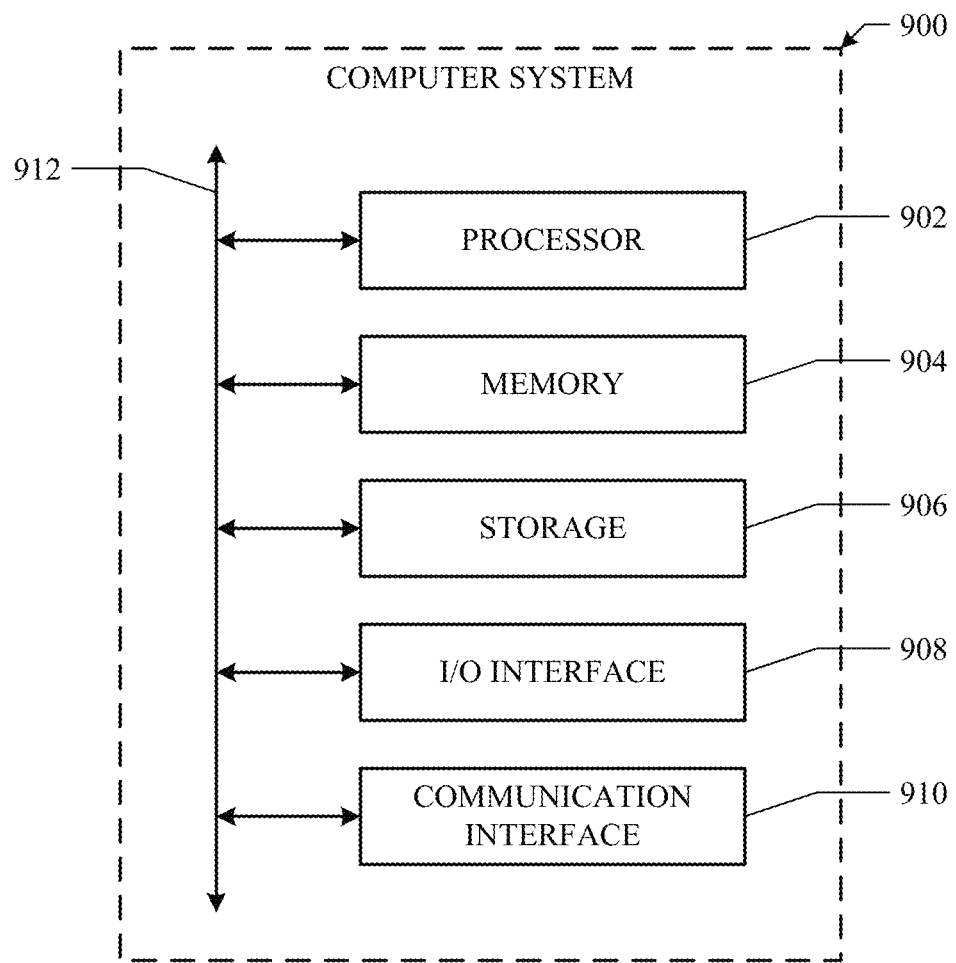
FIG. 9 illustrates an example computer system.

FIG. 9 illustrates an example computer system 900. The computer system 900 may be a computer system associated with the payment service 108, POS device 105, or client device 103. While these devices may have components in common, such as those illustrated in FIG. 9, it should be appreciated that each of the payment service system 108, POS device 105, or client device 103 may be specialized devices configured for their specific purposes. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example, and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example, and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   providing, by a payment service computing platform of a payment service, a graphical user interface (GUI) for display via a payment service application associated with the payment service and executing on an electronic device associated with a user, the GUI including:
      a plurality of interactive icons representative of a plurality of financial accounts associated with the user, wherein each of the plurality of interactive icons corresponds to a respective one of the plurality of financial accounts associated with the user, wherein the plurality of financial accounts include one or more financial accounts with available balances and one or more financial accounts with unavailable balances, and wherein each interactive icon in the GUI displays one or more attributes describing information related to a corresponding financial account; and
      a spendable balance indicator indicating a total available balance based on individual available balances associated with the one or more financial accounts with available balances;
   determining, by the payment service computing platform and based at least in part on a multi-part interaction by the user with one or more of the plurality of interactive icons in the GUI, an indication of the user's intent to transfer funds between a first financial account and second financial account of the plurality of financial accounts;
   generating, by the payment service computing platform and utilizing a machine-learning model, a predicted amount of funds to suggest for transfer from the first financial account to the second financial account, wherein the machine-learning model is trained to determine the predicted amount of funds based on an analysis of a transaction history associated with each of the first financial account and the second financial account;
   causing, by the payment service computing platform, the GUI of the payment service application executing on the electronic device to display the predicted amount of funds concurrently with a request for confirmation;
   determining, by the payment service computing platform and based at least in part on interaction of the user with the GUI, a user confirmation to transfer the predicted amount of funds from the first financial account to the second financial account;
   causing, by the payment service computing platform, initiation of a transfer of the predicted amount of funds from the first financial account to the second financial account; and
   causing, by the payment service computing platform, an update to the GUI based at least in part on a determination of (i) a completion of the transfer of the predicted amount of funds from the first financial account to the second financial account and (ii) that the first financial account or the second financial account is associated with an unavailable balance, the update comprising a dynamic update to the spendable balance indicator and the one or more attributes of the plurality of interactive icons.

2. The method of claim 1, further comprising training the machine-learning model using transaction history data associated with the plurality of financial accounts associated with a plurality of users to determine the predicted amount of funds to transfer, wherein the transaction history data comprises signals associated with attributes of a plurality of past transactions.

3. The method of claim 2, wherein the attributes of the plurality of past transactions comprise transaction date and time, one or more source financial accounts, one or more types associated with each of the one or more source financial accounts, one or more destination financial accounts, one or more types associated with each of the one or more destination financial accounts, and one or more associated monetary amounts.

4. The method of claim 2, wherein the attributes of the plurality of past transactions comprise an indication of whether the transaction was recurring and a time period between occurrences of the recurring transaction.

5. A method comprising:
   storing, in a data store maintained by a payment service computing platform associated with a payment service, transaction history information associated with a first financial account and a second financial account of a user;
   determining, by the payment service computing platform and based at least in part on a multi-part interaction by the user with a user interface of payment service application associated with the payment service executing on an electronic device of the user, an intent by the user to transfer funds between the first financial account and the second financial account;
   generating, by the payment service computing platform and utilizing a machine-learning model, a prediction of a suggested amount of funds for the user to transfer from the first financial account to the second financial account, wherein the machine-learning model is trained to determine the prediction of the suggested amount of funds based on an analysis of transaction history information associated with the user;
   causing, by the payment service computing platform, the user interface of the payment service application to display the suggested amount of funds concurrently with a request to confirm a transfer of the suggested amount of funds from the first financial account to the second financial account;
   receiving, by the payment service computing platform, an indication of the user affirming the request to confirm the transfer of the suggested amount of funds from the first financial account to the second financial account through interaction with the user interface of the payment service application;

in response to receiving the indication of the user affirming the request, causing, by the payment service computing platform, initiation of the transfer of the suggested amount of funds from the first financial account to the second financial account; and causing, by the payment service computing platform, an update to the user interface of the payment service application based at least in part on a determination of (i) a completion of the transfer of the suggested amount of funds from the first financial account to the second financial account and (ii) that the first financial account or the second financial account is associated with an unavailable balance, the update comprising a dynamic update to (i) a spendable balance indicator indicating a total available balance across individual financial accounts of a plurality of financial accounts associated with the user and (ii) one or more attributes of a plurality of interactive objects corresponding to the first financial account and the second financial account.

6. The method of claim 5, wherein the prediction is generated upon receiving, by the payment service computing platform, an indication of a gesture input involving the plurality of interactive objects in the user interface, wherein a first interactive object of the plurality of interactive objects is associated with the first financial account and a second interactive object of the plurality of interactive objects is associated with the second financial account, and wherein the gesture input comprises a selection of the first interactive object followed by a selection of the second interactive object.

7. The method of claim 6, wherein the gesture input comprises a drag-and-drop operation from the first interactive object to the second interactive object.

8. The method of claim 5, wherein the indication of the user affirming the request comprises a modification of the suggested amount of funds to transfer, and wherein the confirmed amount of funds corresponds to the modification.

9. The method of claim 5, wherein the machine-learning model is trained to determine one or more predicted attributes of one or more future transactions, and wherein the suggested amount of funds is based on the predicted attributes.

10. The method of claim 9, further comprising training the machine-learning model using transaction history data associated with a plurality of financial accounts associated with a plurality of users to determine the suggested amount of funds to transfer, wherein the transaction history data comprises signals associated with attributes of a plurality of past transactions.

11. The method of claim 10, wherein the attributes of the plurality of past transactions comprise transaction date and time, one or more source financial accounts, one or more types associated with each of the one or more source financial accounts, one or more destination financial accounts, one or more types associated with each of the one or more destination financial accounts, and one or more associated monetary amounts.

12. The method of claim 11, wherein the one or more types associated with each of the one or more source financial accounts comprises a demand deposit financial account, a checking financial account, a savings financial account, a credit card financial account, an instant credit financial account, a loan financial account, a gift card financial account, or a rewards card financial account.

13. The method of claim 11, wherein the one or more source financial accounts or the one or more destination financial accounts comprises two or more financial accounts, and wherein the attributes of the plurality of past transactions further comprise a ratio determined based on an amount of funds to be allocated to the one or more source financial accounts or the one or more destination financial accounts.

14. The method of claim 10, wherein the attributes of one of the plurality of past transactions comprise an indication of whether the transaction was recurring and a time period between occurrences of the recurring transaction.

15. The method of claim 9, wherein the one or more predicted attributes comprises a predicted date and time of a future transaction, predicted source and destination financial accounts of the future transaction, predicted account types of source and destination financial accounts of the future transaction, one or more predicted monetary amounts associated with the future transaction, predicted recurrence parameters of the future transaction, or a combination thereof.

16. The method of claim 5, wherein the suggested amount of funds is determined based on one or more anticipated needs of the user for funds in the second financial account, and wherein the machine-learning model is further trained to determine the one or more anticipated needs.

17. The method of claim 10, wherein the transaction history data comprises anonymized data of one or more other users of the payment service, and wherein the anonymized data comprises geographical data.

18. The method of claim 5, wherein at least one of the plurality of interactive objects represents a shared folder, and wherein the shared folder is accessible by both the user and a second user of the payment service.

19. The method of claim 5, wherein at least one of the plurality of interactive objects represents a delegate folder linked to a financial account of a second user of the payment service, and wherein the delegate folder is accessible by both the user and the second user.

20. One or more non-transitory computer-readable storage media comprising instructions that, when executed by one or more processors of a payment service computing platform, cause the payment service computing platform to:

store, in a data store maintained by the payment service computing platform associated with a payment service, transaction history information associated with a first financial account and a second financial account of a user;

determine, by the payment service computing platform and based at least in part on a multi-part interaction by the user with a user interface of payment service application associated with the payment service executing on an electronic device of the user, an intent by the user to transfer funds between the first financial account and the second financial account;

generate, by the payment service computing platform and utilizing a machine-learning model, a prediction of a suggested amount of funds for the user to transfer from the first financial account to the second financial account, wherein the machine-learning model is trained to determine the prediction of the suggested amount of funds based on an analysis of transaction history information associated with the user;

cause, by the payment service computing platform, the user interface of the payment service application to display the suggested amount of funds concurrently with a request to confirm a transfer of the suggested amount of funds from the first financial account to the second financial account;

receive, by the payment service computing platform, an indication of the user affirming the request to confirm the transfer of the suggested amount of funds from the first financial account to the second financial account through interaction with the user interface of the payment service application;

in response to receiving the indication of the user affirming the request, cause, by the payment service computing platform, initiation of the transfer of the suggested amount of funds from the first financial account to the second financial account; and cause, by the payment service computing platform, an update to the user interface of the payment service application based at least in part on a determination of (i) a completion of the transfer of the suggested amount of funds from the first financial account to the second financial account and (ii) that the first financial account or the second financial account is associated with an unavailable balance, the update comprising a dynamic update to (i) a spendable balance indicator indicating a total available balance across individual financial accounts of a plurality of financial accounts associated with the user and (ii) one or more attributes of a plurality of interactive objects corresponding to the first financial account and the second financial account.

21. A payment service computing platform comprising one or more processors and a memory coupled to the one or more processors comprising instructions executable by the one or more processors to:

store, in a data store maintained by the payment service computing platform associated with a payment service, transaction history information associated with a first financial account and a second financial account of a user;

determine, by the payment service computing platform and based at least in part on a multi-part interaction by the user with a user interface of payment service application associated with the payment service executing on an electronic device of the user, an intent by the user to transfer funds between the first financial account and the second financial account;

generate, by the payment service computing platform and utilizing a machine-learning model, a prediction of a suggested amount of funds for the user to transfer from the first financial account to the second financial account, wherein the machine-learning model is trained to determine the prediction of the suggested amount of funds based on an analysis of transaction history information associated with the user;

cause, by the payment service computing platform, the user interface of the payment service application to display the suggested amount of funds concurrently with a request to confirm a transfer of the suggested amount of funds from the first financial account to the second financial account;

receive, by the payment service computing platform, an indication of the user affirming the request to confirm the transfer of the suggested amount of funds from the first financial account to the second financial account through interaction with the user interface of the payment service application;

in response to receiving the indication of the user affirming the request, cause, by the payment service computing platform, initiation of the transfer of the suggested amount of funds from the first financial account to the second financial account; and cause, by the payment service computing platform, an update to the user interface of the payment service application based at least in part on a determination of (i) a completion of the transfer of the suggested amount of funds from the first financial account to the second financial account and (ii) that the first financial account or the second financial account is associated with an unavailable balance, the update comprising a dynamic update to (i) a spendable balance indicator indicating a total available balance across individual financial accounts of a plurality of financial accounts associated with the user and (ii) one or more attributes of a plurality of interactive objects corresponding to the first financial account and the second financial account.

* * * * *